US012438951B2

(12) United States Patent
Zhou et al.

(10) Patent No.: US 12,438,951 B2
(45) Date of Patent: Oct. 7, 2025

(54) ELECTRONIC DEVICE, METHOD, AND COMPUTER PROGRAM PRODUCT FOR OBTAINING IPV6 ADDRESSES

(71) Applicant: Sony Group Corporation, Tokyo (JP)

(72) Inventors: Mingtuo Zhou, Tokyo (JP); Xiaoxue Wang, Tokyo (JP); Chen Sun, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/603,229

(22) Filed: Mar. 13, 2024

(65) Prior Publication Data
US 2024/0333806 A1 Oct. 3, 2024

(30) Foreign Application Priority Data
Mar. 31, 2023 (CN) .......................... 202310339570.2

(51) Int. Cl.
*H04L 67/147* (2022.01)
*H04L 67/141* (2022.01)
*H04L 67/63* (2022.01)

(52) U.S. Cl.
CPC .......... *H04L 67/147* (2013.01); *H04L 67/141* (2013.01); *H04L 67/63* (2022.05)

(58) Field of Classification Search
CPC ...... H04L 67/141; H04L 67/147; H04L 67/63
See application file for complete search history.

(56) References Cited

U.S. PATENT DOCUMENTS

2021/0136854 A1\* 5/2021 Kuge ................... H04W 76/19

FOREIGN PATENT DOCUMENTS

| CN | 110012121 | A |   | 7/2019  |            |
|----|-----------|---|---|---------|------------|
| CN | 112584461 |   | * | 9/2019  | H04W 40/248 |
| CN | 110447302 | A | * | 11/2019 | H04L 12/4633 |
| CN | 110892783 | A |   | 3/2020  |            |
| CN | 112235776 | A |   | 1/2021  |            |
| GB | 2626572   | A | * | 7/2024  | H04L 61/35 |

(Continued)

OTHER PUBLICATIONS

Cisco "IPv6 PDU sessions", https://www.cisco.com/c/en/us/td/docs/wireless/ucc/smf/2024-01/config-admin/b_ucc-5g-smf-config-and-admin-guide_2024-01/m_ipv6-pdu-sessions.pdf (Year: 2020).*

(Continued)

*Primary Examiner* — Glenton B Burgess
*Assistant Examiner* — Patrick F Ngankam
(74) *Attorney, Agent, or Firm* — XSENSUS LLP

(57) ABSTRACT

The present disclosure relates to an electronic device, method, and computer program product for obtaining IPv6 addresses. Various embodiments for obtaining and providing IPv6 addresses are described. In an embodiment, an electronic device includes a processing circuit configured to: send a first message to a network, wherein the first message comprises both a first PDU session establishment request message for a first PDU session and a Router Solicitation (RS); and in response to the sending of the first message, receive a second message from the network, the second message comprising both a first PDU session establishment accept message for the first PDU session and a Router Advertisement (RA), wherein the RA comprises a first IPv6 prefix.

10 Claims, 12 Drawing Sheets

(56) References Cited

FOREIGN PATENT DOCUMENTS

| KR | 101652448 B1 * | 8/2016 | ......... H04L 61/2007 |
|---|---|---|---|
| WO | 2022/112174 A1 | 6/2022 | |

OTHER PUBLICATIONS

Cisco "IPv6 PDU Sessions", https://www.cisco.com/c/en/us/td/docs/wireless/ucc/smf/2022-04-0/SMF_Config_Admin/b_ucc-5g-smf-config-and-admin-guide_2022-04/m_ipv6-pdu-sessions.pdf (Year: 2022).*

3GPP, "3rd Generation Partnership Project; Technical Specification Group Radio Access Network; Solutions for NR to support non-terrestrial networks (NTN) (Release 16)", 3GPP TR 38.821 V16.1.0, May 2021, pp. 1-140.

* cited by examiner

ELECTRONIC DEVICE, METHOD, AND COMPUTER PROGRAM PRODUCT FOR OBTAINING IPV6 ADDRESSES

CROSS-REFERENCE TO RELATED APPLICATION

The present application claims priority to Chinese Patent Application No. 202310339570.2, filed on Mar. 31, 2023, the content of which is incorporated herein by reference in its entirety.

TECHNICAL FIELD

The present disclosure relates generally to communication systems and methods, including technologies used for quickly obtaining and providing IPv6 addresses in wireless communication systems.

BACKGROUND

Internet Protocol version 6 (IPv6), as a standard protocol for the network layer of the Internet, is designed to resolve problems in a current protocol version regarding address exhaustion, security, autoconfiguration, scalability, and the like. IPv6 can extend capabilities of the Internet, making new applications (including point-to-point and mobile applications) possible. IPv6 can perform autoconfiguration for a variety of connectivity situations, not requiring any manual intervention. For example, IPv6 can support stateful address autoconfiguration and stateless address autoconfiguration (SLAAC) mechanisms.

Given benefits of IPv6, the 5th generation (5G) wireless communication systems also adopt IPv6. In 5G wireless communication systems, various devices (including terminal devices) need to obtain and use IPv6 addresses quickly and efficiently. For example, for applications requiring low-latency communication or fast network reconfiguration (such as real-time control systems and Internet of Things (IoT) devices) and specific application scenarios (for example, non-terrestrial networks (NTN)), it is beneficial to reducing wait time for IPv6 address configuration and obtaining.

SUMMARY

A first aspect of the present disclosure relates to a communication method. The communication method includes: sending a first message to a network, where the first message includes both a first PDU session establishment request message for a first PDU session and a router solicitation (RS); and in response to the sending of the first message, receiving a second message from the network, the second message including both a first PDU session establishment accept message for the first PDU session and a router advertisement (RA), where the RA includes a first IPv6 prefix. The first aspect of the present disclosure also relates to an electronic device. The electronic device includes a processing circuit configured to perform the method according to the first aspect. In an embodiment, the electronic device may be used for a terminal device.

A second aspect of the present disclosure relates to a communication method. The communication method includes: in response to reception of a first message from a terminal device, assigning a first interface identifier and a first IPv6 prefix to the terminal device, where the first message includes both a first PDU session establishment request message for a first PDU session and a router solicitation (RS); and sending a second message to the terminal device, the second message including a first PDU session establishment accept message for the first PDU session and a router advertisement (RA), where the first PDU session establishment accept message includes the first interface identifier, and the RA includes the first IPv6 prefix. The second aspect of the present disclosure also relates to an electronic device. The electronic device includes a processing circuit configured to perform the method according to the second aspect. In an embodiment, the electronic device may be used for a session management function (SMF).

A third aspect of the present disclosure relates to a computer-readable storage medium, where executable instructions are stored therein, which when executed by one or more processors, implement operations of methods according to various embodiments in the present disclosure.

A fourth aspect of the present disclosure relates to a computer program product, where the computer program product includes instructions which, when executed by a computer, cause implementation of methods according to various embodiments in the present disclosure.

The above summary is provided to summarize some exemplary embodiments in order to provide a basic understanding of the various aspects of the subject matter described herein. Therefore, the above-described features are merely examples and should not be construed as limiting the scope or spirit of the subject matter described herein in any way. Other features, aspects, and advantages of the subject matter described herein will become apparent from the Detailed Description described below in conjunction with the drawings.

BRIEF DESCRIPTION OF THE DRAWINGS

A better understanding of the present disclosure can be achieved by referring to the detailed description given hereinafter in connection with the accompanying drawings. The same or similar reference numerals are used in the accompanying drawings to denote the same or similar components. The accompanying drawings together with the following detailed description are included in the specification and form a part of the specification, and are used to exemplify the embodiments of the present disclosure and explain the principles and advantages of the present disclosure. where.

The embodiments described in the present disclosure are examples only, and may have various modifications and alternative forms. It should be understood that the drawings and detailed description thereof are not intended to limit the solutions to the specific forms disclosed, but to cover all modifications, equivalents, and alternatives falling within the spirit and scope of the claims.

DESCRIPTION OF EMBODIMENTS

The following describes representative applications of various aspects of the device and method according to the present disclosure. The description of these examples is merely to add context and help to understand the described embodiments. Therefore, it is clear to those skilled in the art that the embodiments described below can be implemented without some or all of the specific details. In other instances, well-known process steps have not been described in detail to avoid unnecessarily obscuring the described embodiments. Other applications are also possible, and the solution of the present disclosure is not limited to these examples.

Generally, all terms used in the specification are interpreted based on their ordinary meanings in related technical fields, unless a different meaning and/or implication is clearly provided in context of use. Unless otherwise explicitly stated, a reference to an element, an apparatus, a component, a unit, an operation, and the like is intended to be openly interpreted as at least one instance of the element, apparatus, component, unit, and operation. Operations of any method disclosed in the specification need not be performed in an exact order disclosed, unless an operation is explicitly or implicitly described as following or preceding another operation. Any feature of any embodiment disclosed in the specification may be applied to any other appropriate embodiment. Likewise, any merit of any embodiment may be applied to any other embodiment, and vice versa. Other objectives, features, and merits of embodiments become clear from the following descriptions.

Example of a Communication System

Figure 1:
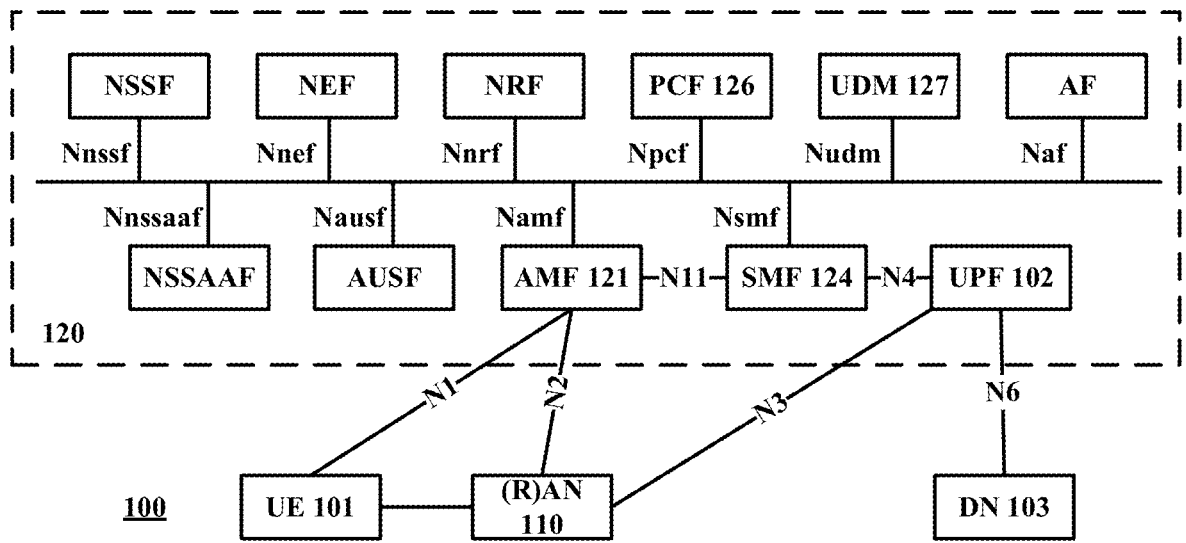
FIG. 1 illustrates an example structure of a communication system according to an embodiment of the present disclosure.

FIG. 1 illustrates an example structure of a communication system according to an embodiment of the present disclosure. As shown in FIG. 1, the communication system 100 includes a terminal device 101, a radio access network ((R)AN) 110, a data network (DN) 103, and a 5G core network (5GC) 120. Although the communication system 100 is described using a 5GC as an example, it should be understood that embodiments in the present disclosure may also be applicable to communication systems of a similar network structure that are being developed or will be developed in the future.

In the present disclosure, the terminal device may have the full breadth of its ordinary meanings, for example, the terminal device may be a mobile station (MS), user equipment (UE), and so on. The terminal device can be implemented as a device such as a mobile phone, a handheld device, a media player, a computer, a laptop computer, a tablet computer, an on-board unit (OBU) or a vehicle, a roadside unit (RSU), a wearable device, an Internet of Things (IoT) device, or a wireless device of almost any type. In some cases, the terminal device may communicate using multiple wireless communication technologies. For example, the terminal device may be configured to communicate using one or more of GSM, UMTS, CDMA2000, WiMAX, LTE, LTE-A, WLAN, NR, Bluetooth, and so on. In some embodiments, the terminal device 101 may be located in or implemented itself as a means of transportation (a vehicle, an aircraft, or the like) that can move quickly.

The (R)AN 110 may include one or more base stations. In the present disclosure, the base station may be a 5G NR base station, such as gNB and ng-eNB. The gNB may provide NR user plane and control plane protocols for terminating with the terminal device. The ng-eNB is a node defined for compatibility with the 4G LTE communication system, which may be an upgrade of an evolved NodeB (eNB) of an LTE radio access network, providing an evolved universal terrestrial radio access (E-UTRA) user plane and control plane protocols for terminating with UEs. In addition, examples of the base station may include but are not limited to the following: at least one of a base transceiver station (BTS) and a base station controller (BSC) in a GSM system; at least one of a radio network controller (RNC) and a Node B in a WCDMA system; access points (APs) in WLAN and WiMAX systems; and corresponding network nodes in communication systems to be developed or under development. Part of functions of a base station herein can also be implemented as an entity that has control functions to communication in D2D, M2M, and V2X scenarios, or as an entity that plays a role of spectrum coordination in the cognitive radio communication scenario. In some embodiments, the (R)AN 110 may be implemented as a terrestrial or non-terrestrial network to provide the terminal device 101 with wireless communication services.

The data network (DN) 103 may be used to provide, for example, operator services, Internet access, or third-party services.

The 5GC 120 may include one or more of the following network functions (Network Function, NF): an authentication server function (AUSF), an access and mobility management function (AMF) 121, a session management function (SMF) 124, a network exposure function (NEF), a policy control function (PCF) 126, a network repository function (NRF), a unified data management (UDM) 127, an application function (AF), a user plane function (UPF) 102, a network slice selection function (NSSF), and a network slice specific authentication and authorization function (NS-SAAF). These network functions may be connected by various interfaces and/or reference points, for example, as shown in FIG. 1. The network functions may be implemented as discrete network elements on dedicated hardware, as software instances running on dedicated hardware, or as virtualized functions instantiated on an appropriate platform (for example, dedicated hardware or cloud infrastructure). It should be understood that various processings, functions, and features according to the present disclosure may be applicable to other core networks (including those developed and to be developed) in addition to 5GC.

The AMF 121 may be responsible for registration management (for example, responsible for UE registration), connection management, reachability management, mobility management, lawful interception of AMF-related events, and access authentication and authorization. The AMF may be a termination point of an N11 reference point between the AMF and the SMF. The AMF may be a termination point of a RAN CP interface, where the RAN CP interface may include or be an N2 reference point between the (R)AN and the AMF. The AMF may be a termination point of NAS (N1) signaling, and performs NAS encryption and integrity protection.

The SMF 124 may be responsible for session management SM (for example, session establishment, modification, and release, including maintenance of tunnels between the UPF and the AN node), assignment and management of UE IP addresses, selection and control of UP functions, configuration of a traffic diversion for the UPF to route traffic to a correct destination, termination of an interface towards the policy control function, control parts of policy enforcement and QoS, lawful interception (for SM events and an interface to a LI system), termination of SM parts of NAS messages, downlink data notification, initiation of AN-specific SM information that passes through the AMF and reaches the AN via N2, and determining of an SSC mode of a session. SM may refer to PDU session management. A PDU session or "session" may refer to a PDU connectivity service that provides or implements PDU switching between UE and a data network (DN) identified by a data network name (DNN). A PDU session may be established on the UE's request, modified on the UE and 5GC's request, and released on the UE and 5GC's request, using NAS SM signaling that is exchanged between the UE and the SMF via an N1 reference point. The 5GC may trigger a specific application in the UE when requested from an application server. In response to reception of a trigger message, the UE may transfer the trigger message (or a related part/information in the trigger message) to one or more recognized applications in the UE. The recognized applications in the UE may establish PDU sessions to a specific DNN. The SMF may check whether a UE request matches user subscription information associated with the UE. In this regard, the SMF may perform retrieval and/or make requests to receive update notifications regarding SMF-level subscription data from the UDM.

The PCF 126 may provide policy rules for a control plane function to enforce them, and may also support a unified policy framework used for managing network behaviors. The PCF may also implement FE to access subscription information related to policy decisions in a UDR of the UDM. The PCF may present an interface that is based on an Npcf service. The UDM 127 may process subscription-related information to support processing of communication sessions by network entities, and may store subscription data of UEs. The UDM may present an interface that is based on an Nudm service.

IPv6 Address and Stateless Address Autoconfiguration (SLAAC)

An IPv6 address is an IPv6-based IP layer identifier for one or more interfaces. For example, an IPv6 address may be a link-local address or a global address. The link-local address is a link-scope-only address which may be used to reach nodes that are attached to a same link. In contrast, the global address has an unrestricted scope. In the present disclosure, IPv6 global addresses are also referred to as IPv6 addresses for short. IPv6 addresses generally refer to IPv6 global addresses, unless otherwise indicated.

Figure 2A:
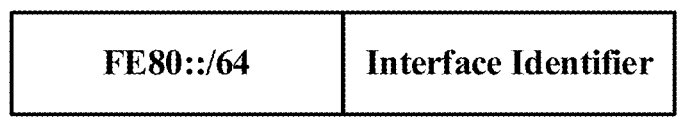
FIG. 2A and FIG. 2B illustrate an example of an IPv6 link-local address and an example of an IPv6 global address respectively.
Figure 2B:
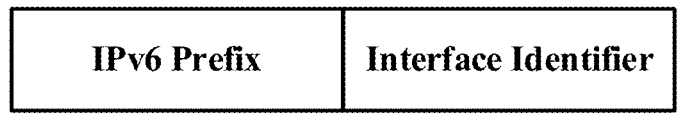

FIG. 2A and FIG. 2B illustrate an example of an IPv6 link-local address and an example of an IPv6 global address, respectively. As shown, the IPv6 link-local address and the IPv6 global address both include an interface identifier and a prefix, both of which may be a bit string of a specific length (for example, 64 bits). The interface identifier is a link-dependent identifier for an interface and is unique at least for each link. The interface identifier may be created in a plurality of manners. In embodiments of the present disclosure, a terminal device may derive an interface identifier based on a link layer address (for example, a media access control (MAC) address) of an interface, or a network function (for example, the SMF) may configure an interface identifier for the terminal device.

Generally, a prefix of a link-local address may be fixed to FE80::/64. In this way, once an interface identifier is determined, a terminal device can generate an IPv6 link-local address based on the interface identifier and the fixed prefix. In an embodiment of the present disclosure, a network function (for example, the SMF) may assign IPv6 prefixes of global addresses, which is implemented by, for example, a stateless address autoconfiguration (SLAAC) mechanism of IPv6 addresses. Accordingly, the terminal device can generate an IPv6 global address based on the interface identifier and the assigned IPv6 prefix.

The SLAAC mechanism allows a host (for example, a terminal device) to generate an IPv6 global address of its own by combining locally available information and information advertised by a router (including a network function, for example, the SMF), with no need to manually configure the host. Specifically, it may be as follows: an IPv6 prefix may be advised by the router to identify a subnet associated with a link, and an interface identifier may be generated by the host to uniquely identify an interface on the subnet. An IPv6 global address is then formed by combining both the IPv6 prefix and the interface identifier.

Figure 3:
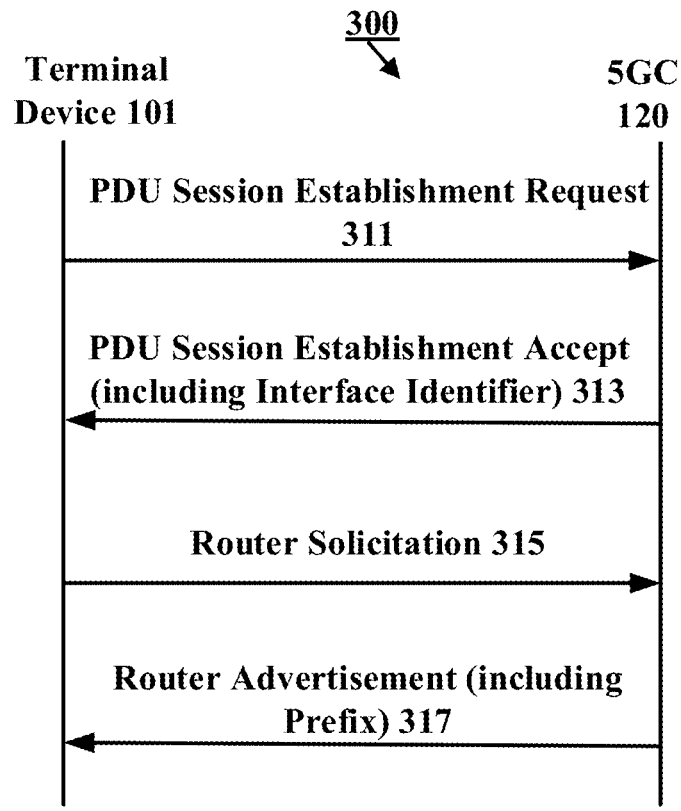
FIG. 3 illustrates an example operation of obtaining an IPv6 address using an SLAAC mechanism.

FIG. 3 illustrates an example operation of obtaining an IPv6 address using an SLAAC mechanism. Although the operation 300 is described below with reference to the communication system in FIG. 1, it should be understood that the operation may also be applicable to communication systems that are being developed or will be developed in the future. According to related technical specifications in 3GPP, when an IPv6 global address is assigned to a terminal device using the SLAAC mechanism, after a PDU session is established, the terminal device usually sends a router solicitation (RS) message to a network (for example, an SMF) to solicit a router advertisement (RA) message. Accordingly, an IPv6 prefix is assigned to the terminal device by the network (for example, the SMF). The IPv6 prefix is included in the router advertisement message, in order to be sent to the terminal device.

As shown in FIG. 3, at 311, a terminal device 101 sends a PDU session establishment request message to a network (for example, a 5GC 120). For example, the PDU session establishment request message may be sent using a NAS message. At 313, after network functions perform corresponding processings, the 5GC 120 sends a PDU session establishment accept message to the terminal device 101. Likewise, the PDU session establishment accept message may be sent using a NAS message. The PDU session establishment accept message may include an interface identifier assigned by an SMF. Upon receiving the PDU session establishment accept message, the terminal device 101 may generate an IPv6 link-local address based on the interface identifier.

As shown in FIG. 3, at 315, in order to quickly obtain a router advertisement message (and an IPv6 prefix included), the terminal device 101 may send a router solicitation message to the 5GC 120 to solicit the router advertisement message from, for example, the SMF 124. For example, the terminal device 101 may send the router solicitation message using the generated IPv6 link-local address. Accordingly, at 317, after, for example, the SMF 124, performs corresponding processing, the 5GC 120 sends the router advertisement message (including an IPv6 prefix) to the terminal device 101. Upon receiving the router advertisement message, the terminal device 101 may generate an IPv6 global address based on the IPv6 prefix. Thereby, the terminal device 101 can communicate with an external network using the IPv6 global address.

In the example in FIG. 3, to obtain the IPv6 prefix, the terminal device 101 needs to proactively send the router solicitation message after a PDU session establishment procedure is completed. In the operation 300, there are a plurality of information exchanges between the terminal device 101 and the 5GC 120, and at least two round trip times (RTT) need to be consumed between the terminal device 101 and a base station. This is not desired for the terminal device to quickly obtain an IPv6 address. For example, a plurality of RTTs are disadvantageous to a service with a high requirement for latency, a service that needs to be quickly configured, and the like. Particularly, compared with a terrestrial network, in a non-terrestrial network, a distance between the terminal device 101 located on the ground and a satellite is on an order of magnitude of hundreds or even tens of thousands of kilometers. A RTT between the terminal device 101 and a base station is quite long (for example, a few milliseconds to hundreds of milliseconds). As a result, a process of the terminal device 101 obtaining an IPv6 prefix also consumes more time.

In an embodiment of the present disclosure, by adjusting a manner how the SLAAC mechanism is applied between a terminal device and a network function, the terminal device can obtain an IPv6 prefix more quickly in a procedure of establishing a PDU session for the first time. In some embodiments, by reusing a previously determined IPv6 address during re-establishment of a PDU session, overheads of the network function (for example, the SMF) for assigning a new IPv6 prefix can be reduced, and corresponding time for obtaining the IPv6 prefix can be saved.

Example of Electronic Device

Figure 4A:
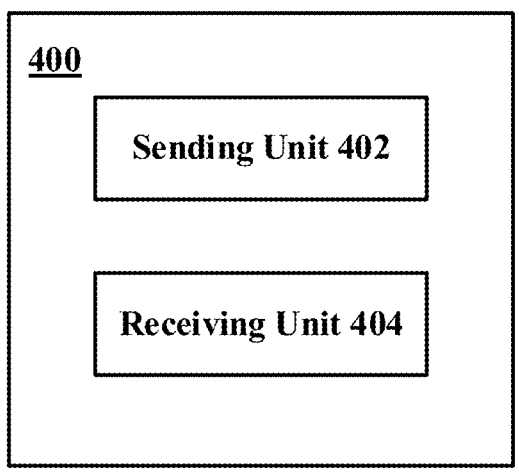
FIG. 4A illustrates an example electronic device for a terminal device according to an embodiment of the present disclosure.

FIG. 4A illustrates an example electronic device 400 for a terminal device according to an embodiment of the present disclosure. The terminal device corresponds to, for example, the terminal device 101 in FIG. 1. The electronic device 400 may include various units to implement embodiments for obtaining an IPv6 address according to embodiments. As shown in FIG. 4A, the electronic device 400 includes a sending unit 402 and a receiving unit 404. The various operations described below in combination with the terminal device and with obtaining of an IPv6 address may be performed by the units 402 and 404 or by another potential unit (for example, a processing unit or control unit) of the electronic device 400.

In an embodiment, the sending unit 402 is configured to send a first message to a network (for example, a 5G core network), to establish a first PDU session and obtain an IPv6 address. The first message may include both a first PDU session establishment request message for a first PDU session and a router solicitation (RS). Accordingly, in response to the sending of the first message, the receiving unit 404 is configured to receive a second message from the network. The second message includes a first PDU session establishment accept message for the first PDU session and a router advertisement (RA), where the router advertisement includes a first IPv6 prefix. In an embodiment, optionally, the electronic device 400 may generate its IPv6 global address based on the first IPv6 prefix using, for example, its processing unit or control unit.

In an embodiment, the electronic device 400 may be implemented at the chip level, or may be implemented at the device level by including other external components (for example, radio links, antennas and the like). The electronic device 400 may be used as a whole machine and work as a communication device.

Figure 4B:
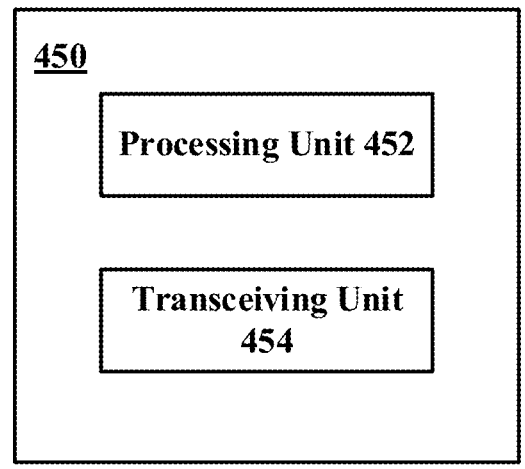
FIG. 4B illustrates an example electronic device for a session management function (SMF) according to an embodiment of the present disclosure.

FIG. 4B illustrates an example electronic device 450 for a session management function (SMF) according to an embodiment of the present disclosure. The SMF corresponds to, for example, the SMF 124 in FIG. 1. The electronic device 450 may include various units to implement embodiments for providing an IPv6 address according to embodiments. As shown in FIG. 4B, the electronic device 450 includes a processing unit 452 and a transceiving unit 454. The various operations described below in combination with the SMF and with providing of an IPv6 address may be performed by the units 452 and 454 or by another potential unit of the electronic device 450.

In an embodiment, the processing unit 452 is configured to: in response to reception of a first message from a terminal device, assign a first interface identifier and a first IPv6 prefix to the terminal device. For example, the first message includes a first PDU session establishment request message for a first PDU session and a router solicitation (RS). Accordingly, the transceiving unit 454 is configured to send a second message to the terminal device, the second message including a first PDU session establishment accept message for the first PDU session and a router advertisement (RA). For example, the first PDU session establishment accept message includes the first interface identifier, and the router advertisement includes the first IPv6 prefix.

In an embodiment, the electronic device 450 may be implemented at the chip level, or may be implemented at the device level by including other external components (for example, wired or wireless links). The electronic device 450 may be used as a whole machine and work as a communication device.

It should be noted that the units are merely logical modules obtained through division of specific functions implemented by the units, rather than being used to limit specific implementations. For example, the units may be implemented in a form of software, hardware, or a combination of software and hardware. During actual implementation, each of the units may be implemented as a standalone physical entity, or may be implemented by a single entity (for example, a processor (a CPU, a DSP, or the like), or an integrated circuit). A processing circuit may be any implementation of a digital circuit system, an analog circuit system, or a hybrid-signal (a combination of analog and digital signals) circuit system that performs functions in a computing system. The processing circuit may include, for example, a circuit such as an integrated circuit (IC) or an application-specific integrated circuit (ASIC), a portion or circuit of a separate processor core, an entire processor core, a separate processor, a programmable hardware device such as a field programmable gate array (FPGA), and/or a system including a plurality of processors.

Obtaining an IPv6 Address Quickly

Figure 5:
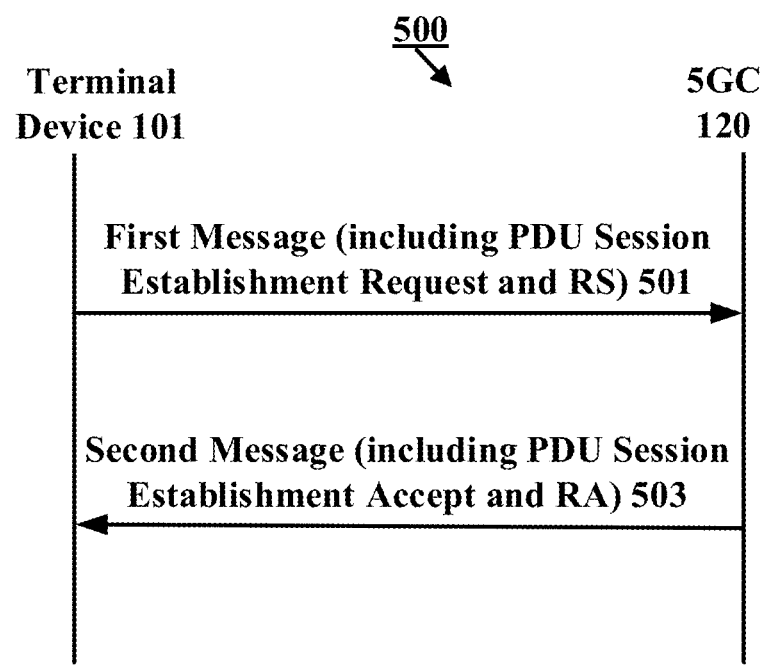
FIG. 5 illustrates an example operation of obtaining an IPv6 address using an SLAAC mechanism according to an embodiment of the present disclosure.

FIG. 5 illustrates an example operation of obtaining an IPv6 address using an SLAAC mechanism according to an embodiment of the present disclosure. Although the operation 500 is described below with reference to the communication system in FIG. 1, it should be understood that the operation may also be applicable to communication systems that are being developed or will be developed in the future. According to the operation 500, the SLAAC mechanism may be combined with a PDU session establishment procedure, so that an IPv6 prefix is assigned and obtained while establishing a PDU session.

As shown in FIG. 5, at 501, a terminal device 101 sends a first message to a network (for example, a 5GC 120). The first message includes both a PDU session establishment request message for a first PDU session and a RS. For example, the first message may be sent using a NAS message. By sending the first message, the terminal device 101 not only requests to establish a PDU session from the network, but also solicits a router advertisement message from, for example, an SMF 124 to quickly obtain a router advertisement message (and an IPv6 prefix included). In an embodiment, prior to sending the first message, the terminal device 101 may derive an interface identifier (for example, an EUI-64 interface identifier) based on a link layer address (for example, a MAC address) of an interface of the terminal device 101. The terminal device 101 may generate a link-local address based on the interface identifier, and use the link-local address when sending the first message.

At 503, after network functions perform corresponding processings, the 5GC 120 sends a second message to the terminal device 101, the second message including both a PDU session establishment accept message for the first PDU session and a RA. For example, the corresponding processings performed by the network functions may include configuring the PDU session to be established and assigning an IPv6 prefix to the terminal device 101. Likewise, the second message may be sent using a NAS message. In an embodiment, the PDU session establishment accept message may include an interface identifier assigned by the SMF, and the router advertisement may include an IPv6 prefix that the SMF assigns in response to the RS. Upon receiving the second message, the terminal device 101 can obtain the interface identifier and the IPv6 prefix assigned by the SMF. Accordingly, the terminal device 101 may generate an IPv6 link-local address based on the interface identifier and generate an IPv6 global address based on the IPv6 prefix. When generating the IPv6 addresses, the terminal device 101 may use the interface identifier assigned by the SMF or the interface identifier derived by itself.

In the example in FIG. 5, the terminal device 101 sends the router solicitation required by the SLAAC mechanism together with the request message used for the PDU session establishment procedure, that is, proactively solicits a router advertisement from a router (for example, the SMF 124) while initiating the PDU session establishment procedure. Accordingly, the network function (for example, the SMF 124) receives both the PDU session establishment request message and the router solicitation through a single message, and performs operations accordingly, including, for example, setting PDU session establishment and assigning the interface identifier and the IPv6 prefix to the terminal device 101. The network function (for example, the SMF 124) then sends both the PDU session establishment accept message and the RA, providing the terminal device 101 with the assigned interface identifier and IPv6 prefix using a single message.

In the operation 500, there is one information exchange between the terminal device 101 and the 5GC 120, and only one RTT is consumed between the terminal device 101 and a base station, advantageously reducing time taken by the terminal device 101 to obtain an IPv6 address. This is desired for a service with a high requirement for latency, a service that needs to be quickly configured, and the like. In a non-terrestrial network, a reduction of one information exchange between the terminal device 101 and the 5GC 120 means a reduction of one RTT between the terminal device 101 and the base station.

The following scenario parameters in Table 1 are from 3GPP TR 38.821 V16.1.0. As shown in Table 1, for a satellite-based non-terrestrial network, a contribution of a LEO satellite to a round trip delay on a radio interface between a base station and a terminal device ranges from a few milliseconds to tens of milliseconds, and a contribution of a GEO satellite to a round trip delay on a radio interface between a base station and a terminal device is on an order of magnitude of hundreds of milliseconds. It can be learned that by using embodiments in the present disclosure, the cost of time when a terminal device obtains an IPv6 global address using a procedure of establishing a PDU session for the first time in a non-terrestrial network can be reduced by, for example, a few milliseconds to even hundreds of milliseconds.

TABLE 1

| NTN scenario | A<br>GEO<br>transparent<br>payload | B<br>GEO<br>regenerative<br>payload | C1<br>LEO<br>transparent<br>payload | C2 | D1<br>LEO<br>regenerative<br>payload | D2 |
|---|---|---|---|---|---|---|
| Satellite altitude | 35,786 kilometers | | 600 kilometers | | | |
| Relative speed of Satellite with respect to earth | Negligible | | 7.56 kilometers/second | | | |
| Minimum elevation for both feeder and service links | 10° for service link and 10° for feeder link | | | | | |

TABLE 1-continued

| NTN scenario | A<br>GEO<br>transparent<br>payload | B<br>GEO<br>regenerative<br>payload | C1<br>LEO<br>transparent<br>payload | C2<br>D1<br>LEO<br>regenerative<br>payload | D2 |
|---|---|---|---|---|---|
| Typical Minimum/Maximum NTN beam footprint diameter | 100 kilometers/3500 kilometers | | 50 kilometers/1000 kilometers | | |
| Maximum propagation delay contribution to the Round Trip Delay on the radio interface between the gNB and the UE | 541.46 milliseconds | 270.73 milliseconds | 25.77 milliseconds | 12.89 milliseconds | |
| Minimum propagation delay contribution to the Round Trip Delay on the radio interface between the gNB and the UE | 477.48 milliseconds | 238.74 milliseconds | 8 milliseconds | 4 milliseconds | |
| Maximum reduction contribution to the delay in obtaining an IPv6 address by the present solution | 541.46 milliseconds | 541.46 milliseconds | 25.77 milliseconds | 25.78 milliseconds | |
| Minimum reduction contribution to the delay in obtaining an IPv6 address by the present solution | 477.48 milliseconds | 477.48 milliseconds | 8 milliseconds | 8 milliseconds | |

Figure 6:
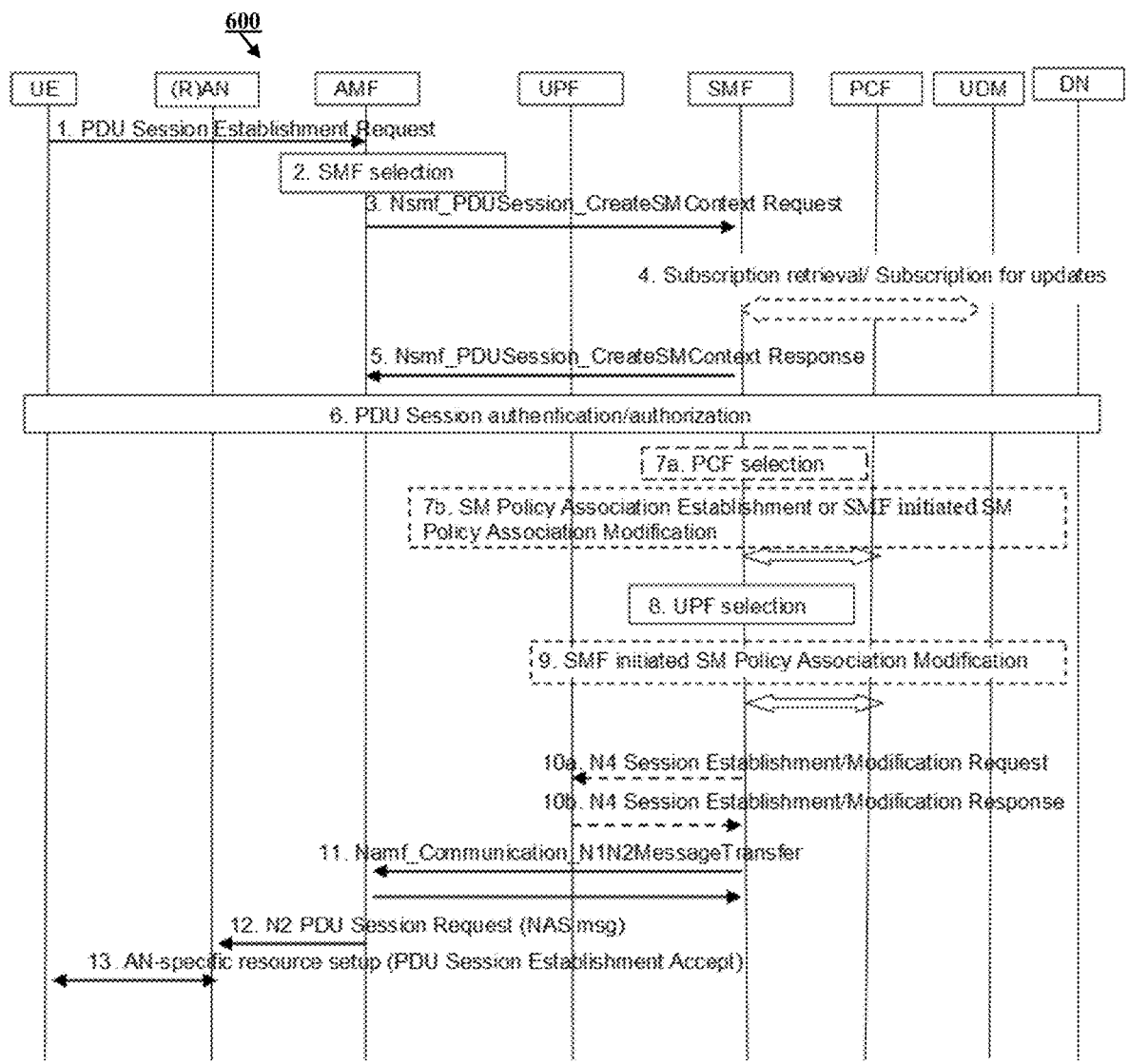
FIG. 6 illustrates an example signaling flow of obtaining an IPv6 address using an SLAAC mechanism according to an embodiment of the present disclosure.

FIG. 6 illustrates an example signaling flow 600 of obtaining an IPv6 address using an SLAAC mechanism according to an embodiment of the present disclosure. In the example in FIG. 6, a terminal device establishes a PDU session S1 for the first time using a PDU session establishment procedure. The PDU session S1 is of a session type of IPv6 or IPv4v6.

As shown in FIG. 6, devices or network functions used in the signaling flow include a UL, an (R)AN, an AMF, a UPF, an SMF, a PCF, a UDM, and a DN. For example, the UL may be the terminal device 101, the (R)AN may be the (R)AN 110, the AMF may be the AMF 121, the UPF may be the UPF 102, the SMF may be the SMF 124, the PCF may be the PCF 126, the UDM may be the UDM 127, and the DN may be the DN 103 in FIG. 1. In some embodiments, by following the signaling flow, an interface identifier and an IPv6 prefix may be assigned to the terminal device while a PDU session is established for the terminal device for the first time.

As shown in FIG. 6, at operation 1, the UE initiates a PDU session establishment request. Specifically, the UE may send a first message to the AMF. The first message includes both a PDU session establishment request and a router solicitation. For example, the first message may be sent using a NAS message. The first message may include parameters or information elements such as the following: slice information S-NSSAI, a PDU session ID (PDU Session ID), a request type, a data network name (DNN), and an N1 SM container. In this example, the request type is initial request. The N1 SM container may include both the PDU session establishment request and the router solicitation. The PDU session establishment request may include the PDU session ID, a requested PDU session type, a request SSC mode, and the like. In this example, the requested PDU session type is IPv6 or IPv4v6. At operation 2, the AMF selects an SMF for the PDU session establishment request based on the slice information, the data network name, and the like.

As shown in FIG. 6, at operation 3, the AMF sends an Nsmf_PDUSession_CreateSMContext request to the selected SMF, to request a service of creating a PDU session context from the SMF. For example, the Nsmf_PDUSession_CreateSMContext request may include parameters or information elements such as the following: a subscription permanent identifier (SUPI), the data network name (DNN), the slice information (S-NSSAI), the PDU session ID, an AMF ID, and an N1 SM container. The N1 SM container may include both the PDU session establishment request and the router solicitation, so that the PDU session establishment request and the router solicitation are sent to the SMF together. Accordingly, the SMF receives the Nsmf_PDUSession_CreateSMContext request from the AMF, obtains the PDU session establishment request for the PDU session S1, and recognizes the PDU session establishment request and the router solicitation from the request. In response to recognition of the PDU session establishment request, the SMF initiates an establishment procedure for the PDU session S1. In response to recognition of the router solicitation, the SMF starts to assign an IPv6 prefix to the UE based on the SLAAC mechanism.

As shown in FIG. 6, at operation 4, the SMF may perform subscription retrieval/subscription updating. At operation 5, the SMF may send an Nsmf_PDUSession_CreateSMContext response to the AMF to notify an SM context ID. At operation 6, the SMF may initiate PDU session authentication/authorization. At operation 7*a*, the SMF may perform PCF selection. At operation 7*b*, the SMF may perform SM policy association establishment. As shown in FIG. 6, at operation 8, the SMF may select an SSC mode for the PDU session S1 and select one or more UPFs based on a requirement. Based on that the PDU session to be established is of the type of IPv6 or IPv4v6, the SMF also assigns an interface identifier to the UE, so that the UE can establish its link-local address. At operation 9, the SMF may perform SMF-initiated SM policy association modification. At operations 10*a* and 10*b*, the SMF may initiate a procedure of establishing an N4 session to the selected UPF, including sending an N4 session establishment request to the UPF by the SMF and sending an N4 session establishment response to the SMF by the UPF.

As shown in FIG. 6, at operation 11, the SMF sends a second message to the UE via the AMF. The second message is, for example, a NAS message. The second message includes both a PDU session establishment accept for the PDU session S1 and a router advertisement. The second message is, for example, a Namf_Communication_N1N2MessageTransfer message. By using the message, the SMF requests a service of transmitting a message on an N1 interface and a message on an N2 interface from the AMF. The message may include the PDU session ID, N2 SM information, and an N1 SM container. Specifically, the N2 SM information may include parameters or information elements such as the following: the PDU session ID, a QFI, a QoS profile, CN tunnel information (CN Tunnel Info), a session-AMBR, and the PDU session type. The N1 SM container may include both the PDU session establishment accept for the PDU session S1 and the router advertisement. The PDU session establishment accept includes parameters or information elements such as the following: QoS rules (QoS Rule), slice information (S-NSSAI), the selected SSC mode, the interface identifier assigned to the UE, and the PDU session type. The router advertisement includes the IPv6 prefix assigned to the UE.

As shown in FIG. 6, at operation 12, the AMF sends an N2 PDU session request to the (R)AN. The request includes the second message from the SMF. At operation 13, the (R)AN sends an AN-specific resource setup message to the UE. In an embodiment, the (R)AN is configured to forward the second message (for example, an NAS message) from the AMF, the second message including both the PDU session establishment accept for the PDU session S1 and the router advertisement. Upon receiving the second message forwarded by the (R)AN, the UE may generate an IPv6 global address based on the IPv6 prefix in the router advertisement. When generating the IPv6 global address, the UE may use the interface identifier assigned by the SMF to the UE or the interface identifier locally generated by the UE (for example, an EUI-64-based IPv6 interface identifier). The UE may also generate the link-local address based on the interface identifier assigned by the SMF in the PDU session establishment accept.

Reusing an IPv6 Prefix/Address

In a 5G network, during duration of a PDU session, a terminal device may be handed over between different base stations due to mobility. Connectivities between different base stations and network elements (network functions such as a UPF and an SMF) of a core network differ from each other. Therefore, after being handed over to a new base station, the terminal device may need to establish connections to the UPF and the SMF using the new base station. If connectivities between the new base station and the original network elements such as the UPF and the SMF are not ideal (for example, a transmission delay is excessively large), the UPF or SMF needs to be changed. When the SMF is not changed, the SMF releases the PDU session to the original UPF and establishes a PDU session to a new UPF. If the SMF needs to be changed, a new SMF may be selected based on connectivity to a new UPF. In an SSC2 mode, the SMF first releases the PDU session to the original UPF and then establishes a PDU session to the new UPF. In an SSC3 mode, the SMF first establishes a PDU session to the new UPF and then releases the PDU session to the original UPF. In embodiments of the present disclosure, the IPv6 address of the PDU session to the original UPF is retained while the PDU session is released, avoiding a processing delay associated with assignment of an address to the new PDU session.

Figure 7:
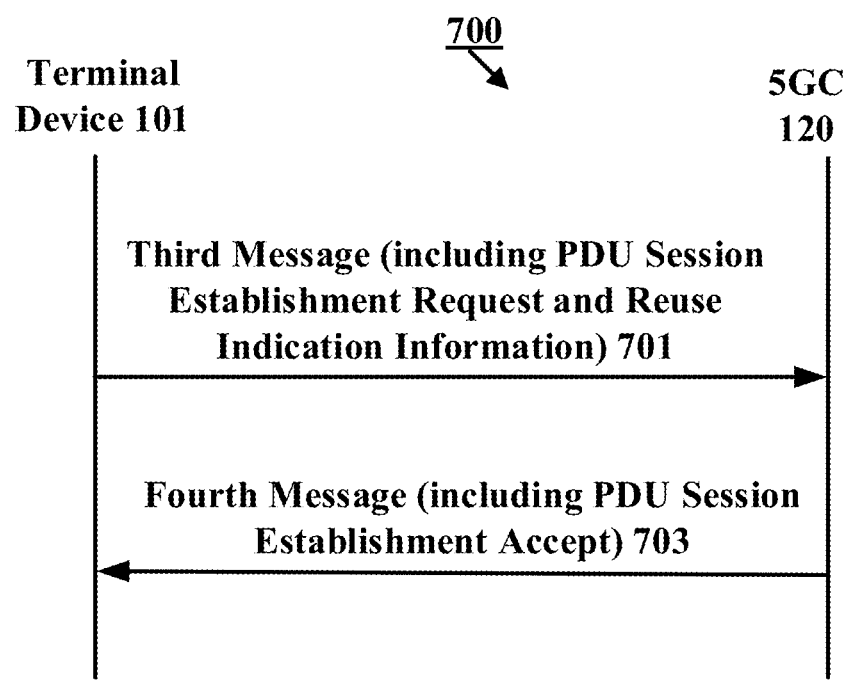
FIG. 7 illustrates an example operation of reusing an IPv6 address or IPv6 prefix according to an embodiment of the present disclosure.

FIG. 7 illustrates an example operation of reusing an IPv6 address or IPv6 prefix according to an embodiment of the present disclosure. Although the operation 700 is described below with reference to the communication system in FIG. 1, it should be understood that the operation may also be applicable to communication systems that are being developed or will be developed in the future. According to the operation 700, by using reuse indication information, a terminal device may indicate to a network (for example, an SMF) to reuse a previously assigned IPv6 prefix or IPv6 address during re-establishment of a PDU session. The IPv6 prefix or IPv6 address is, for example, assigned when the terminal device establishes the PDU session for the first time.

As shown in FIG. 7, at 701, the terminal device 101 sends a third message to a network (for example, the 5GC 120), the third message including a PDU session establishment request message for a second PDU session and reuse indication information. In an embodiment of the present disclosure, the reuse indication information may indicate that at least a previously assigned IPv6 prefix is to be reused for the second PDU session. For example, an IPv6 prefix or an entire IPv6 address (that is, an IPv6 prefix and an interface identifier) may be reused. The third message may indicate a previously assigned IPv6 prefix or interface identifier by including an ID of a previous PDU session. In an embodiment, the reuse indication information may include a first indicator. The first indicator may be a single bit, with a value 0 or 1 to indicate that corresponding information is not reused or is reused, respectively. In an embodiment, in addition to the first indicator or as an alternative, the reuse indication information may include a previously assigned IPv6 prefix or include both a previously assigned IPv6 prefix and a previously assigned interface identifier. The third message may be sent using a NAS message. By using the reuse indication information, the terminal device 101 indicates reuse of the IPv6 prefix or IPv6 address (including the IPv6 prefix and interface identifier) to a network (for example, an SMF) while requesting to re-establish the PDU session. When the reuse indication information per se includes the IPv6 prefix or interface identifier, even in a case of an SMF handover, a new SMF can also quickly obtain and reuse corresponding information.

At 703, after network functions perform corresponding processings, the 5GC 120 sends a fourth message to the terminal device 101, the fourth message including a PDU session establishment accept message for the second PDU session. In an embodiment, when the terminal device 101 receives the PDU session establishment accept message, it indicates that the SMF acknowledges reuse of the IPv6 prefix or IPv6 address. In an embodiment, the fourth message further includes a first acknowledgment indicator, used to explicitly indicate whether the SMF acknowledges reuse of the IPv6 prefix or IPv6 address. For example, the first acknowledgment indicator may be a single bit, with a value 0 or 1 to indicate whether or not reuse of corresponding information is acknowledged, respectively.

In the example in FIG. 7, the previously assigned IPv6 prefix or IPv6 address is reused during re-establishment of the PDU session, reducing a processing delay that is caused when the network function (for example, the SMF) assigns an IPv6 prefix or interface identifier again. It should be understood that the delay reduction is even more advantageous in a case of a plurality of PDU session re-establishments (for example, due to a UPF anchor or an SMF handover). For example, in a non-terrestrial network, a terminal device may move at high speed and over a wide area due to being in a plane. In this scenario, there may be base station handovers, UPF changes, and SMF changes for the terminal device. In the process, repeated operations of establishing and releasing a PDU session may occur frequently. If applications such as video calling and video conferencing are running on the terminal device, user experience would be affected. In an embodiment of the present disclosure, the IPv6 address of the PDU session to an original UPF is retained while the PDU session is released, significantly improving user experience.

Figure 8:
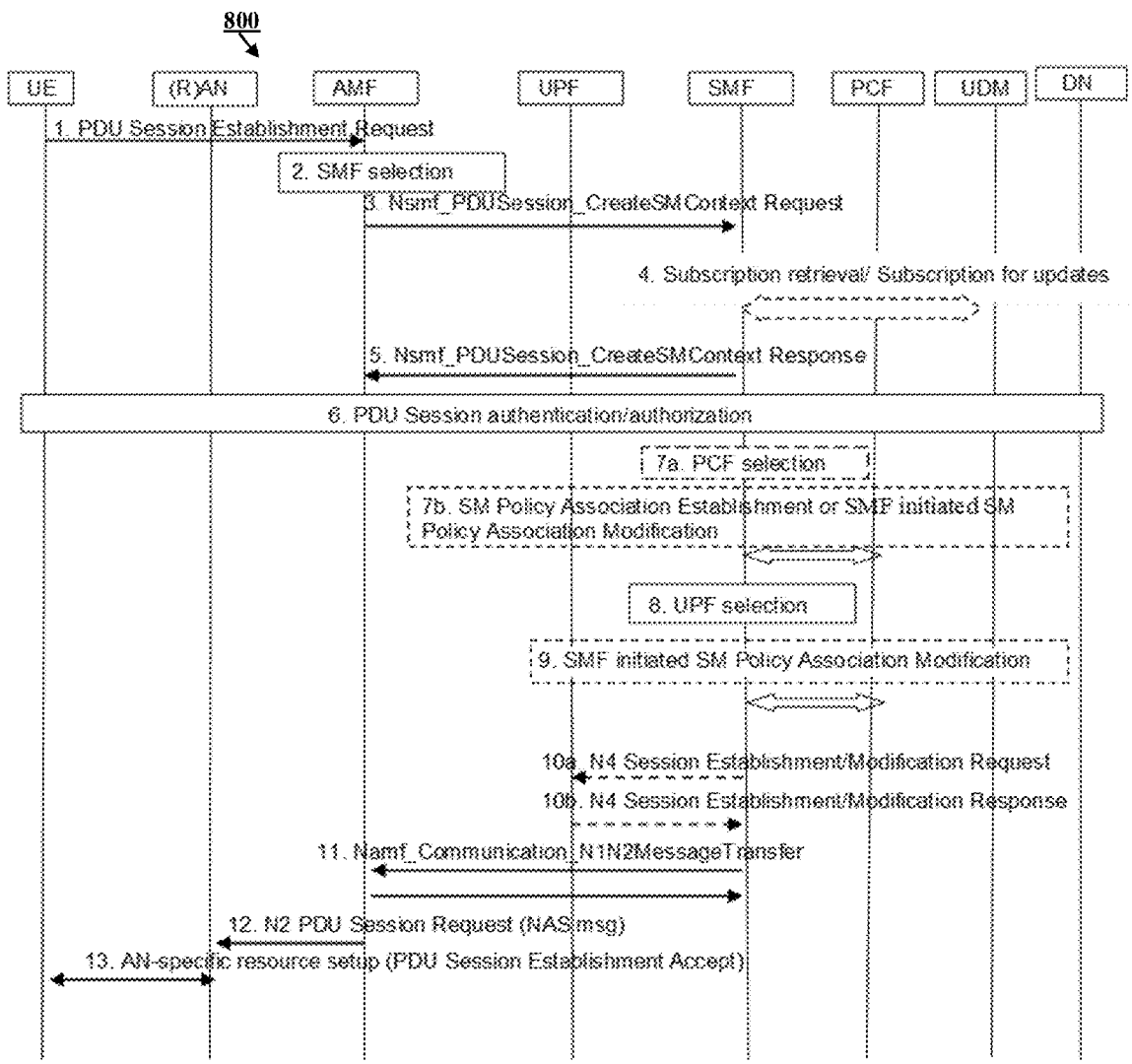
FIG. 8 illustrates an example signaling flow of reusing an IPv6 address or IPv6 prefix according to an embodiment of the present disclosure.

FIG. 8 illustrates an example signaling flow 800 of reusing an IPv6 address or IPv6 prefix according to an embodiment of the present disclosure. The signaling flow 800 may correspond to a signaling flow of a PDU session release in non-roaming and roaming with local breakout. In the example, a terminal device may have previously established a PDU session S1, and requests to re-establish a PDU session S2. For example, a base station handover occurs due to mobility of the terminal device, and the terminal device may need to disconnect from a previously connected UPF or even SMF and establish a PDU session to a new UPF or even SMF. The PDU session S2 is of a session type of IPv6 or IPv4v6.

Likewise, as shown in FIG. 8, devices or network functions used in the signaling flow include a UE, an (R)AN, an AMF, a UPF, an SMF, a PCF, a UDM, and a DN. For example, the UE may be the terminal device 101, the (R)AN may be the (R)AN 110, the AMF may be the AMF 121, the UPF may be the UPF 102, the SMF may be the SMF 124, the PCF may be the PCF 126, the UDM may be the UDM 127, and the DN may be the DN 103 in FIG. 1. In some embodiments, by following the signaling flow, an IPv6 prefix or IPv6 global address previously assigned to the terminal device may be reused when a PDU session is re-established for the terminal device.

As shown in FIG. 8, at operation 1, the UE initiates a PDU session establishment request. Specifically, the UE may send a third message to the AMF, the third message including a PDU session establishment request and reuse indication information. The reuse indication information may indicate that at least the previously assigned IPv6 prefix is to be reused for the PDU session S2. For example, the reuse indication information may include the first indicator described above, the previously assigned IPv6 prefix, and/or a previously assigned interface identifier. Parameters or information elements of the third message may be understood with reference to FIG. 6. The PDU session establishment request and the reuse indication information may be included in an N1 SM container. At operation 2, the AMF selects an SMF for the PDU session establishment request based on slice information, a data network name, and the like.

As shown in FIG. 8, at operation 3, the AMF sends an Nsmf_PDUSession_CreateSMContext request to the selected SMF, to request a service of creating a PDU session context from the SMF. Parameters or information elements of the Nsmf_PDUSession_CreateSMContext request may be understood with reference to FIG. 6. The PDU session establishment request and the reuse indication information may be included in an N1 SM container. Accordingly, the SMF receives the Nsmf_PDUSession_CreateSMContext request from the AMF, obtains the PDU session establishment request for the PDU session S2, and recognizes the PDU session establishment request and the reuse indication information from the request. In response to recognition of the PDU session establishment request, the SMF initiates an establishment procedure for the PDU session S2. In response to recognition of the reuse indication information, the SMF may skip assigning an IPv6 prefix to the UE (for example, based on an SLAAC mechanism), reducing a delay which would be caused when the SMF assigns an IPv6 prefix.

Operation 4 to operation 7b may be understood with reference to FIG. 6. As shown in FIG. 8, at operation 8, the SMF may select an SSC mode for the PDU session S2 and select one or more UPFs based on a requirement. When the reuse indication information indicates reuse of the interface identifier, the SMF does not need to assign an interface identifier to the UE. This can reduce a delay which would be caused when the SMF assigns an interface identifier. At operation 9, the SMF may initiate SM policy association modification. At operations 10a and 10b, the SMF may initiate a procedure of establishing an N4 session to the selected UPF, including sending an N4 session establishment request to the UPF by the SMF and sending an N4 session establishment response to the SMF by the UPF.

As shown in FIG. 8, at operation 11, the SMF sends a fourth message to the UE via the AMF. The fourth message is, for example, a NAS message. The fourth message includes a PDU session establishment accept message for the PDU session S2. In an embodiment, the fourth message further includes a first acknowledgment indicator, used to explicitly indicate whether the SMF acknowledges reuse of the IPv6 prefix or IPv6 address. The fourth message is, for example, a Namf_Communication_N1N2MessageTransfer message. By using the message, the SMF requests a service of transmitting a message on an N1 interface and a message on an N2 interface from the AMF. The message may include the PDU session ID, N2 SM information, and an N1 SM container. Parameters or information elements of the message may be understood with reference to FIG. 6. The PDU session establishment accept message and a possible first acknowledgment indicator may be included in an N1 SM container. Compared with a procedure of establishing a PDU session for the first time, in this procedure, the SMF does not need to indicate an assigned IPv6 prefix and an assigned interface identifier to the UE, reducing corresponding signaling overheads.

As shown in FIG. 8, at operation 12, the AMF sends an N2 PDU session request to the (R)AN. The request includes the fourth message from the SME At operation 13, the (R)AN sends an AN-specific resource setup message to the UE. In an embodiment, the (R)AN is configured to forward the fourth message (for example, an NAS message) from the AMF. Upon receiving the fourth message forwarded by the (R)AN, the UE may generate an IPv6 global address by reusing the previously assigned IPv6 prefix and/or interface identifier. The UE may also generate a link-local address by reusing the previously assigned interface identifier.

PDU Session Release Procedure in the SSC Mode 2

Figure 9:
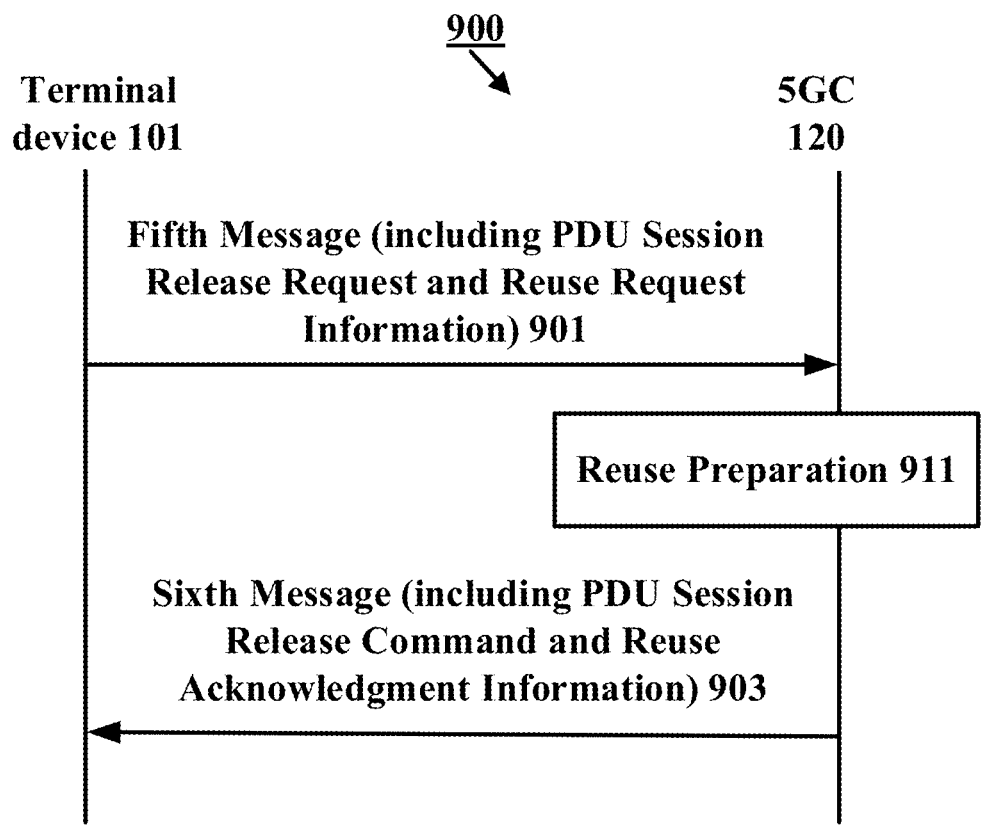
FIG. 9 illustrates an example operation of a PDU session release in a session and service continuity (SSC) mode 2 according to an embodiment of the present disclosure.

FIG. 9 illustrates an example operation of a PDU session release in the SSC mode 2 according to an embodiment of the present disclosure. Although the operation 900 is described below with reference to the communication system in FIG. 1, it should be understood that the operation may also be applicable to communication systems that are being developed or will be developed in the future. According to the operation 900, in the SSC mode 2, a terminal device may indicate to a network (for example, an SMF) to reuse a previously assigned IPv6 prefix and/or IPv6 address during re-establishment of a PDU session, while requesting to release a PDU session. In this way, the terminal device and the network (for example, the SMF) may retain an existing IPv6 prefix and/or an existing interface identifier of the terminal device, reducing overheads and delay that are associated with assignment of an IPv6 prefix and/or an interface identifier during establishment of a new PDU session.

As shown in FIG. 9, at 901, the terminal device 101 sends a fifth message to a network (for example, a 5GC 120), the fifth message including a PDU session release request for, for example, a first PDU session and reuse request information. In an embodiment of the present disclosure, the reuse request information may indicate to a network (for example, an SMF) that the terminal device 101 expects an IPv6 prefix and/or an interface identifier associated with the first PDU session to be released to be reused for a third PDU session to be later established. In an embodiment, the reuse request information may include a second indicator. The second indicator may be a single bit, with a value 0 or 1 to indicate that corresponding information is not reused or is reused, respectively. The fifth message may be sent using a NAS message. By using the reuse request information, the terminal device 101 indicates to the network (for example, the SMF) that an IPv6 prefix or an entire IPv6 address (including an IPv6 prefix and an interface identifier) associated with a current PDU session is to be reused for a PDU session to be established, while requesting to release the current PDU session. In an embodiment, an IPv6 prefix, an interface identifier, or an IPv6 address may be identified by a PDU session ID.

At 911, after receiving the fifth message and recognizing the reuse request information in the fifth message, the SMF may perform a preparation operation for reusing the IPv6 prefix and/or interface identifier associated with the first PDU session to be released. For example, when there is no SMF handover during subsequent establishment of the third PDU session, the SMF may retain the corresponding IPv6 prefix and/or interface identifier. If there is an SMF handover during subsequent establishment of the third PDU session, the SMF needs to send the corresponding IPv6 prefix and/or interface identifier to an SMF to be handed over to.

At 903, after network functions perform corresponding processings, the 5GC 120 sends a sixth message to the terminal device 101, the sixth message including a PDU session release command for the first PDU session and reuse acknowledgment information. In an embodiment of the present disclosure, the reuse acknowledgment information may indicate to the terminal device 101 that the 5GC 120 is ready for reusing the IPv6 prefix and/or interface identifier associated with the first PDU session to be released.

In an example of the preparation operation, in an embodiment, a second terminal device may need to be handed over to the SMF from a second SMF. Accordingly, the SMF may receive a PDU session establishment request message for a PDU session S4 and reuse indication information from the second terminal device, the reuse indication information indicating that an original IPv6 prefix and/or original interface identifier of the second terminal device are/is to be applied to the PDU session S4. The SMF may receive the original IPv6 prefix and/or original interface identifier of the second terminal device provided by the second SMF, and reuse the original IPv6 prefix and original interface identifier for the PDU session S4.

Figure 10:
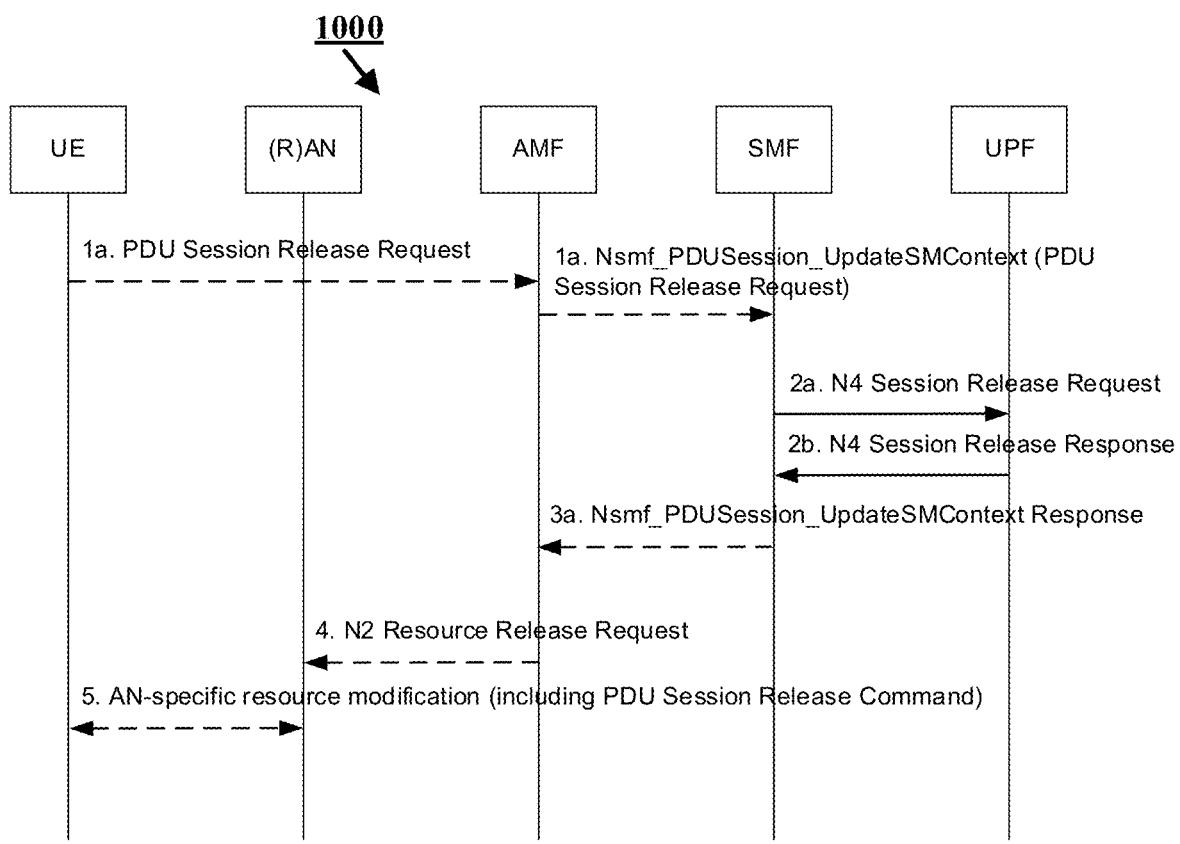
FIG. 10 illustrates an example signaling flow of a PDU session release in an SSC mode 2 according to an embodiment of the present disclosure.

FIG. 10 illustrates an example signaling flow 1000 of a PDU session release in the SSC mode 2 according to an embodiment of the present disclosure. In the example, the terminal device releases a previously established PDU session S1 and establishes a PDU session S3. The PDU session S3 is of a session type of IPv6 or IPv4v6.

As shown in FIG. 10, devices or network functions used in the signaling flow include a UE, an (R)AN, an AMF, a UPF, and an SMF. For example, the UE may be the terminal device 101, the (R)AN may be the (R)AN 110, the AMF may be the AMF 121, the UPF may be the UPF 102, and the SMF may be the SMF 124 in FIG. 1. In some embodiments, by following the signaling flow, prior to a corresponding PDU session is released, the network may be notified to retain an interface identifier and/or IPv6 prefix previously assigned to the terminal device and reuse the interface identifier and/or IPv6 prefix for a PDU session to be established.

As shown in FIG. 10, at operation 1a, the UE triggers a PDU session release procedure by sending a fifth message, the fifth message including a PDU session release request and reuse request information. For example, the fifth message may be sent using a NAS message. The PDU session release request and the reuse request information may be included in an N1 SM container. The NAS message may be forwarded to the AMF by the (R)AN, and forwarded by the AMF to the SMF corresponding to the PDU session S1. Specifically, the AMF may provide the N1 SM container to the SMF by using an Nsmf_PDUSession_UpdateSMContext message. After receiving the Nsmf_PDUSession_UpdateSMContext message, the SMF releases corresponding user plane resources, but retains, based on the reuse request information, an IPv6 prefix and/or interface identifier assigned to the PDU session S1. At operation 2a, the SMF sends an N4 session release request message to the UPF of the PDU session S1. Accordingly, the UPF may discard remaining packets of the PDU session S1 and release tunnel resources and a context associated with an N4 session. At operation 2b, the UPF acknowledges the N4 session release request by sending an N4 session release response message to the SMF.

As shown in FIG. 10, at operation 3a, the SMF sends an Nsmf_PDUSession_UpdateSMContext response message to the AMF. The Nsmf_PDUSession_UpdateSMContext response message may include an N1 SM container. A PDU session release command and reuse acknowledgment information may be included in the N1 SM container. At operation 4, the AMF sends the N1 SM container from the SMF to the (R)AN by using an N2 resource release request. At operation 5, the (R)AN sends the N1 SM container from the AMF to the UE by using an AN-specific resource modification.

Examples of Message Formats

In an embodiment of the present disclosure, when an IPv6 address needs to be obtained, a router solicitation may be included in an N1 SM container together with a PDU session establishment request message, as described with reference to FIG. 6. For example, the router solicitation may be included in the PDU session establishment request message, or may be separated from the PDU session establishment request message but included in the N1 SM container. A router advertisement may be included in an N1 SM container together with a PDU session establishment accept message. For example, the router advertisement is included in the PDU session establishment accept message, or is separated from the PDU session establishment accept message but included in the N1 SM container.

In an embodiment of the present disclosure, when an IPv6 address needs to be reused, reuse indication information may be included in an N1 SM container together with a PDU session establishment request message, as described with reference to FIG. 8. For example, the reuse indication information may be included in the PDU session establishment request message, or may be separated from the PDU session establishment request message but included in the N1 SM container.

In an embodiment of the present disclosure, for the SSC mode 2, when an IPv6 address needs to be reused, reuse request information may be included in an N1 SM container together with a PDU session release request message, as described with reference to FIG. 10. For example, the reuse request information may be included in the PDU session release request message, or may be separated from the PDU session release request message but included in the N1 SM container. Reuse acknowledgment information may be included in an N1 SM container together with a PDU session release response message. For example, the reuse acknowledgment information may be included in the PDU session release response message, or may be separated from the PDU session release response message but included in the N1 SM container.

Example Methods

Figure 11:
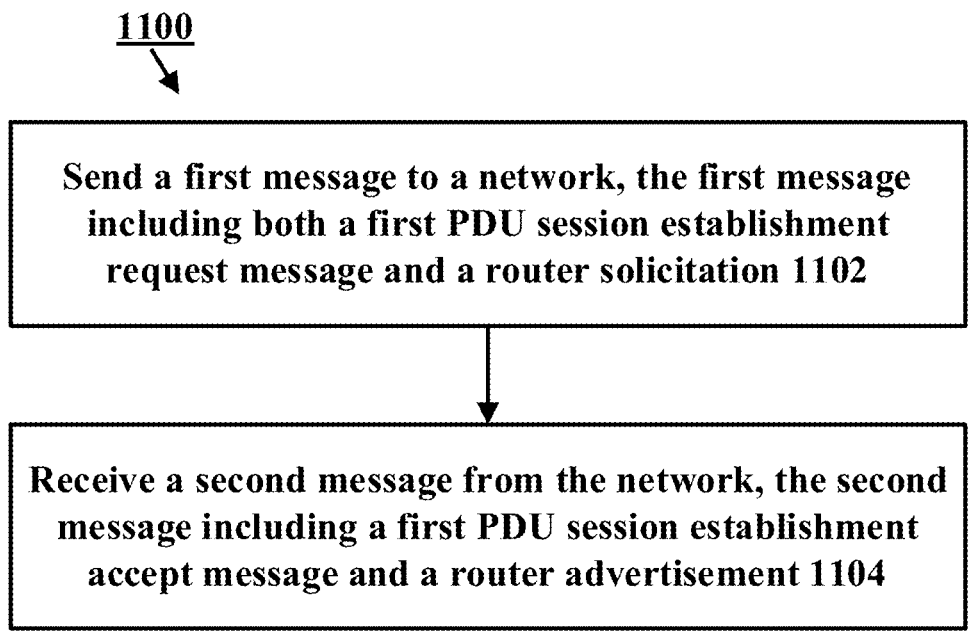
FIG. 11 illustrates an example method for obtaining an IPv6 address according to an embodiment of the present disclosure.

FIG. 11 illustrates an example communication method according to an embodiment of the present disclosure. The method may be performed by, for example, the terminal device 101 or the electronic device 400. An IPv6 address can be obtained fast by using the method. As shown in FIG. 11, the method 1100 may include: sending a first message to a network, where the first message includes both a first PDU session establishment request message for a first PDU session and a router solicitation (block 1102). As shown in FIG. 11, the method 1100 may further include, in response to the sending of the first message, receiving a second message from the network, the second message including both a first PDU session establishment accept message for the first PDU session and a router advertisement (block 1104). The router advertisement includes a first IPv6 prefix. Further details of the method may be understood with reference to the foregoing descriptions of the electronic devices and terminal devices.

In an embodiment, the first PDU session establishment accept message further includes a first interface identifier assigned to the terminal device by a session management function SMF. The method 1100 further includes generating a link-local address based on the first interface identifier; and/or generating a first IPv6 address based on the first IPv6 prefix and a second interface identifier, where the second interface identifier is the first interface identifier or is another interface identifier generated by the terminal device.

In an embodiment, the method 1100 further includes: prior to sending the first message, generating an EUI-64 interface identifier based on a local MAC address.

In an embodiment, the method 1100 further includes sending a second PDU session establishment request message for a second PDU session and reuse indication information to the network, where the reuse indication information indicates that at least the first IPv6 prefix is to be reused for the second PDU session.

In an embodiment, the method 1100 further includes, prior to sending the second PDU session establishment request message, sending a first PDU session release request message for the first PDU session and reuse request information to the network, where the reuse request information indicates that the terminal device expects to reuse at least the first IPv6 prefix; and receiving a first PDU session release response message for the first PDU session and reuse acknowledgment information from the network, where the reuse acknowledgment information indicates that the network is ready to reuse at least the first IPv6 prefix.

In an embodiment, the reuse indication information, the reuse request information, or the reuse acknowledgment information is also used for reuse of the first interface identifier.

In an embodiment, the network includes a non-terrestrial network.

In an embodiment, at least one of the following is true: the router solicitation is included in or separated from the first PDU session establishment request message, and both are included in an N1 SM container; the router advertisement is included in or separated from the first PDU session establishment accept message, and both are included in an N1 SM container; the reuse indication information is included in or separated from the second PDU session establishment request message, and both are included in an N1 SM container; the reuse request information is included in or separated from the first PDU session release request message, and both are included in an N1 SM container; or the reuse acknowledgment information is included in or separated from the first PDU session release response message, and both are included in an N1 SM container.

Figure 12:
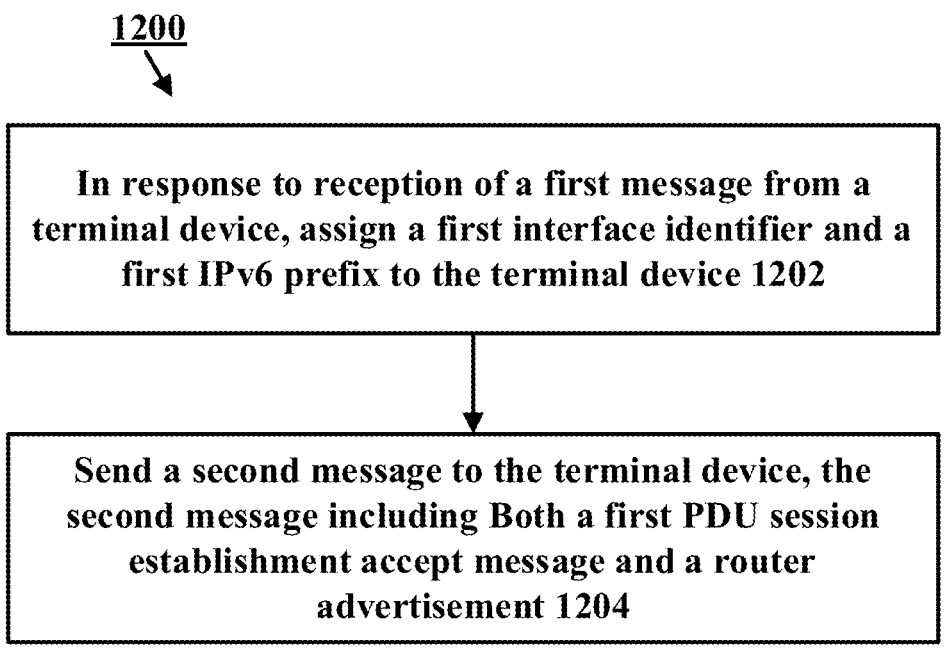
FIG. 12 illustrates an example method for providing an IPv6 address according to an embodiment of the present disclosure.

FIG. 12 illustrates an example communication method according to an embodiment of the present disclosure. The method may be performed by an SMF 124 or an electronic device 450. An IPv6 address can be provided efficiently by using the method. As shown in FIG. 12, the method 1200 may include, in response to reception of a first message from a terminal device, assigning a first interface identifier and a first IPv6 prefix to the terminal device (block 1202). The first message includes both a first PDU session establishment request message for a first PDU session and a router solicitation. As shown in FIG. 12, the method 1200 may further include sending a second message to the terminal device, the second message including both a first PDU session establishment accept message for the first PDU session and a router advertisement (block 1204). The first PDU session establishment accept message includes the first interface identifier, and the router advertisement includes the first IPv6 prefix. Further details of the method may be understood with reference to the foregoing descriptions of the electronic device 450 or the SMF.

In an embodiment, the method 1200 further includes receiving a second PDU session establishment request message for a second PDU session and reuse indication information from the terminal device, where the reuse indication information indicates that at least the first IPv6 prefix is to be reused for the second PDU session; and in response to the reception of the second PDU session establishment request message, reusing at least the first IPv6 prefix for the second PDU session.

In an embodiment, the method 1200 further includes, prior to receiving the second PDU session establishment request message, receiving a first PDU session release request message for the first PDU session and reuse request information from the terminal device, where the reuse request information indicates that the terminal device expects to reuse at least the first IPv6 prefix; and sending a first PDU session release response message for the first PDU session and reuse acknowledgment information to the terminal device, where the reuse acknowledgment information indicates that a network is ready to reuse at least the first IPv6 prefix.

In an embodiment, the reuse indication information, the reuse request information, or the reuse acknowledgment information is also used for reuse of the first interface identifier. The method 1200 further includes, in response to the reception of the second PDU session establishment request message, also reusing the first interface identifier for the second PDU session.

In an embodiment, the method 1200 further includes: receiving a third PDU session establishment request message for a third PDU session and second reuse indication information from a second terminal device, where the second reuse indication information indicates that an original IPv6 prefix and/or original interface identifier of the second terminal device are/is to be applied to the third PDU session; receiving the original IPv6 prefix and/or original interface identifier of the second terminal device provided by a second SMF; and reusing the original IPv6 prefix and original interface identifier for the third PDU session.

In an embodiment, at least one of the following is true: the router solicitation is included in or separated from the first PDU session establishment request message, and both are included in an N1 SM container; the router advertisement is included in or separated from the first PDU session establishment accept message, and both are included in an N1 SM container; the reuse indication information is included in or separated from the second PDU session establishment request message, and both are included in an N1 SM container; the reuse request information is included in or separated from the first PDU session release request message, and both are included in an N1 SM container; or the reuse acknowledgment information is included in or separated from the first PDU session release response message, and both are included in an N1 SM container.

Various exemplary electronic devices and methods according to embodiments of the present disclosure have been described above. It should be understood that the operations or functions of these electronic devices can be combined with each other to achieve more or less operations or functions than described. The operational steps of the methods can also be combined with each other in any suitable order, so that similarly more or fewer operations are achieved than described.

It should be understood that the machine-executable instructions in the machine-readable storage medium or program product according to the embodiments of the present disclosure can be configured to perform operations corresponding to the device and method embodiments described above. When referring to the above device and method embodiments, the embodiments of the machine-readable storage medium or the program product are clear to those skilled in the art, and therefore description thereof will not be repeated herein. A machine-readable storage media and a program product for carrying or including the above-described machine-executable instructions also fall within the scope of the present disclosure. Such storage medium can include, but is not limited to, a floppy disk, an optical disk, a magneto-optical disk, a memory card, a memory stick, and the like.

Figure 13:
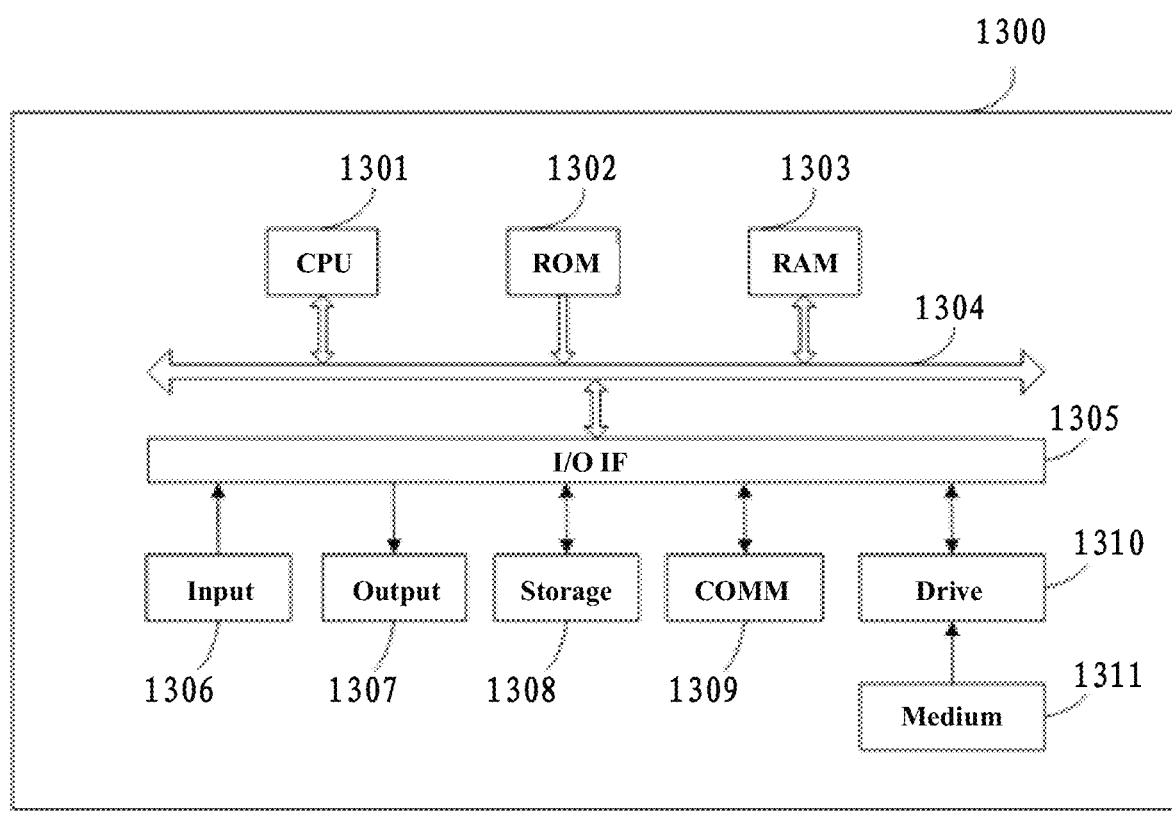
FIG. 13 illustrates an example block diagram of a computer that may be implemented as a terminal device or a network function (e.g., a SMF) according to an embodiment of the present disclosure.

In addition, it should be understood that the above series of processing and devices can alternatively be implemented by software and/or firmware. In the case of implementation by software and/or firmware, a program constituting the software is installed from a storage medium or a network to a computer having a dedicated hardware configuration, such as a general-purpose computer 1300 shown in FIG. 13. FIG. 13 illustrates an example block diagram of a computer that may be implemented as a terminal device or a network function (e.g., a SMF) according to an embodiment of the present disclosure.

In FIG. 13, a central processing unit (CPU) 1301 executes various processing based on a program stored in a read-only memory (ROM) 1302 or a program loaded from a storage portion 1308 to a random access memory (RAM) 1303. The RAM 1303 also stores data required for executing various processing and the like by the CPU 1301 when necessary.

The CPU 1301, the ROM 1302, and the RAM 1303 are connected with each other via a bus 1304. An input/output port 1305 is also connected to the bus 1304.

The following components are connected to the input/output port 1305: an input part 1306, including a keyboard, a mouse, and the like; an output part 1307, including a display such as a cathode-ray tube (CRT) and a liquid crystal display (LCD), a speaker, and the like; a storage part 1308, including a hard disk and the like; and a communication part 1309, including a network interface card such as a LAN card or a modem. The communication part 1309 performs communication processing via a network such as the Internet.

Based on needs, a drive 1310 is also connected to the input/output port 1305. A removable medium 1311 such as a magnetic disk, an optical disk, a magneto-optical disk, a semiconductor memory, or the like is mounted on the drive 1310 when necessary, so that a computer program read therefrom is installed in the storage part 1308 when necessary.

In a case that the foregoing series of processing are implemented by software, programs constituting the software are installed from a network such as the Internet or a storage medium such as the removable medium 1311.

Those skilled in the art should understand that such a storage medium is not limited to the removable medium 1311 shown in FIG. 13, in which the program is stored and distributed independent from a device to provide the program for users. For example, the removable medium 1311 includes a magnetic disk (including a floppy disk (registered trademark)), an optical disc (including a compact disk read-only memory (CD-ROM) and a digital versatile disk (DVD)), a magneto-optical disc (including a mini disk (MD) (registered trademark)), and a semiconductor memory. Alternatively, the storage medium can be the ROM 1302, a hard disk included in the storage part 1308, or the like, in which the program is stored, and can be distributed to users along with a device including the storage medium.

Use cases according to the present disclosure will be described below with reference to FIGS. 14 to 15.

Use Cases for the Terminal Device

First Use Case

Figure 14:
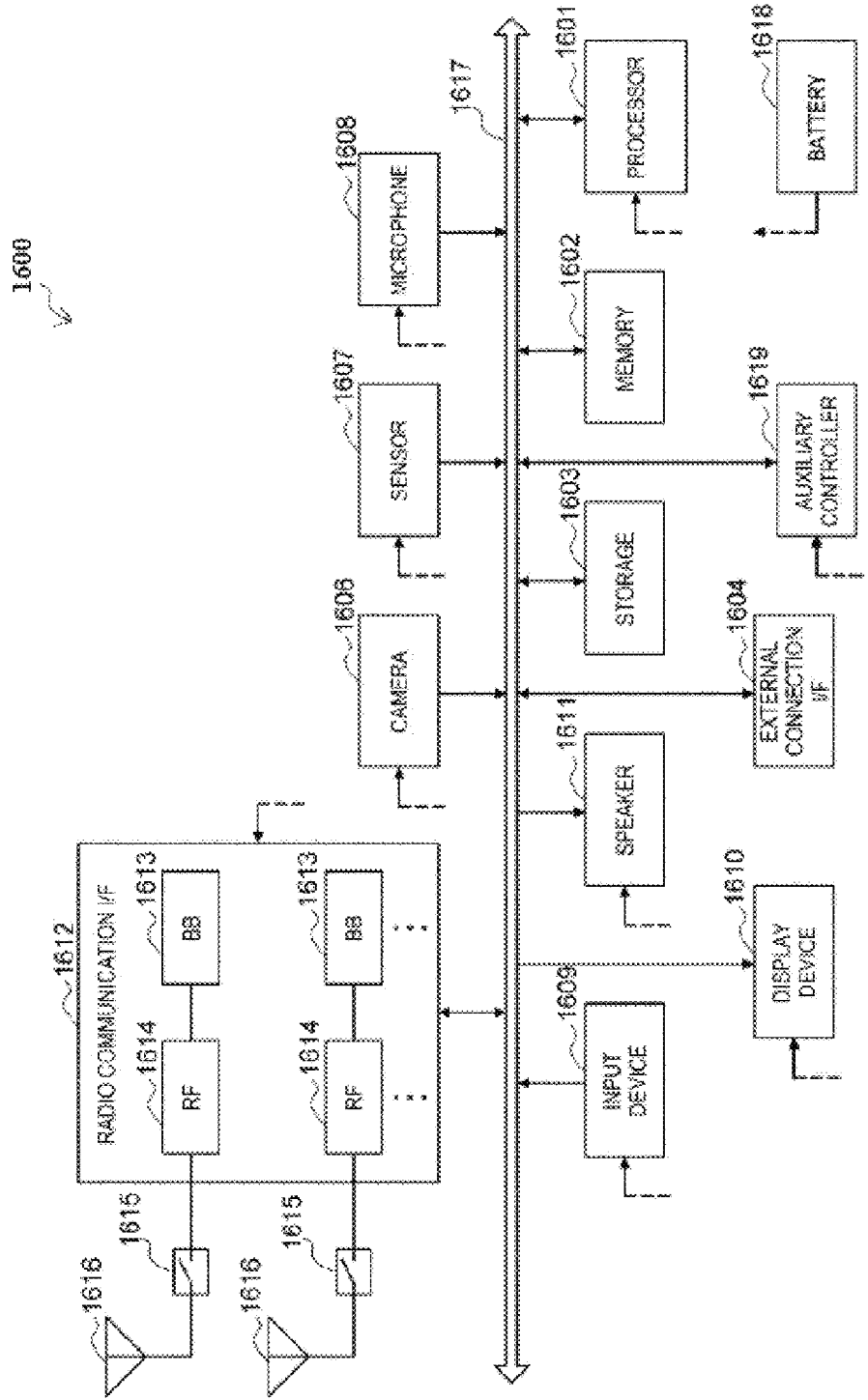
FIG. 14 is a block diagram illustrating an example of a schematic configuration of an smartphone to which the technology of the present disclosure can be applied.

FIG. 14 is a block diagram illustrating an example of a schematic configuration of a smartphone 1600 to which the technology of the present disclosure can be applied. A smartphone 1600 includes a processor 1601, a memory 1602, a storage device 1603, an external connection interface 1604, a camera device 1606, a sensor 1607, a microphone 1608, an input device 1609, a display device 1610, a speaker 1611, a radio communication interface 1612, one or more antenna switches 1615, one or more antennas 1616, a bus 1617, a battery 1618, and an auxiliary controller 1619. In an implementation, the smartphone 1600 (or the processor 1601) herein can correspond to the above-described electronic device 400.

The processor 1601 can be, for example, a CPU or a system on a chip (SoC), and controls functions of the application layer and other layers of the smartphone 1600. The memory 1602 includes a RAM and a ROM, and stores a program that is executed by the processor 1601. The storage device 1603 can include a storage medium such as a semiconductor memory and a hard disk. The external connection interface 1604 is an interface for connecting an external device (for example, a memory card and a universal serial bus (USB) device) to the smartphone 1600.

The camera device 1606 includes an image sensor (for example, a charge coupled device (CCD) and a complementary metal oxide semiconductor (CMOS)), and generates a captured image. The sensor 1607 can include a set of sensors, such as a measurement sensor, a gyro sensor, a geomagnetic sensor, and an acceleration sensor. The microphone 1608 converts the sound input of the smart phone 1600 into an audio signal. The input device 1609 includes, for example, a touch sensor configured to detect touches on the screen of the display device 1610, a keypad, a keyboard, buttons, or switches, and receives input operations or information of a user. The display device 1610 includes a screen (for example, a liquid crystal display (LCD) and an organic light emitting diode (OLED) display), and displays output images of the smartphone 1600. The speaker 1611 converts output audio signals of the smartphone 1600 into sound.

The radio communication interface 1612 supports any cellular communication scheme (such as LTE, LTE-Advanced, and NR) and performs radio communication. The radio communication interface 1612 can typically include, for example, a BB processor 1613 and an RF circuit 1614. The BB processor 1613 can perform, for example, encoding/decoding, modulation/demodulation, and multiplexing/demultiplexing, and performs various types of signal processing for radio communication. Meanwhile, the RF circuit 1614 can include, for example, a mixer, a filter, and an amplifier, and transmits and receives radio signals via the antenna 1616. The radio communication interface 1612 can be a chip module on which the BB processor 1613 and the RF circuit 1614 are integrated. As shown in FIG. 14, the radio communication interface 1612 can include multiple BB processors 1613 and multiple RF circuits 1614. Although FIG. 14 illustrates the example in which the radio communication interface 1612 includes the multiple BB processors 1613 and the multiple RF circuits 1614, the radio communication interface 1612 can also include a single BB processor 1613 or a single RF circuit 1614.

In addition to a cellular communication scheme, the radio communication interface 1612 can support other types of radio communication schemes, such as a short-range wireless communication scheme, a near-field communication scheme, and a wireless local area network (LAN) scheme. In this case, the radio communication interface 1612 can include the BB processor 1613 and the RF circuit 1614 as to each radio communication scheme.

Each of the antenna switches 1615 switches the connection destination of the antenna 1616 among multiple circuits (for example, circuits for different radio communication schemes) included in the radio communication interface 1612.

Each of the antennas 1616 includes one or more antenna elements (such as multiple antenna elements included in a MIMO antenna), and is used for the radio communication interface 1612 to transmit and receive radio signals. As shown in FIG. 14, the smartphone 1600 can include multiple antennas 1616. Although FIG. 14 illustrates an example in which the smartphone 1600 includes multiple antennas 1616, the radio communication interface 1600 can alternatively include a single antenna 1616.

In addition, the smartphone 1600 can include the antennas 1616 for every radio communication scheme. In this case, the antenna switch 1615 can be removed from configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the radio communication interface 1612, and the auxiliary controller 1619. The battery 1618 provides power for various blocks of the smartphone 1600 illustrated in FIG. 14 via feeders, and the feeders are partially expressed as dashed lines in the figure. The auxiliary controller 1619, for example, operates the minimum necessary functions of the smartphone 1600 in sleep mode.

Second Use Case

Figure 15:
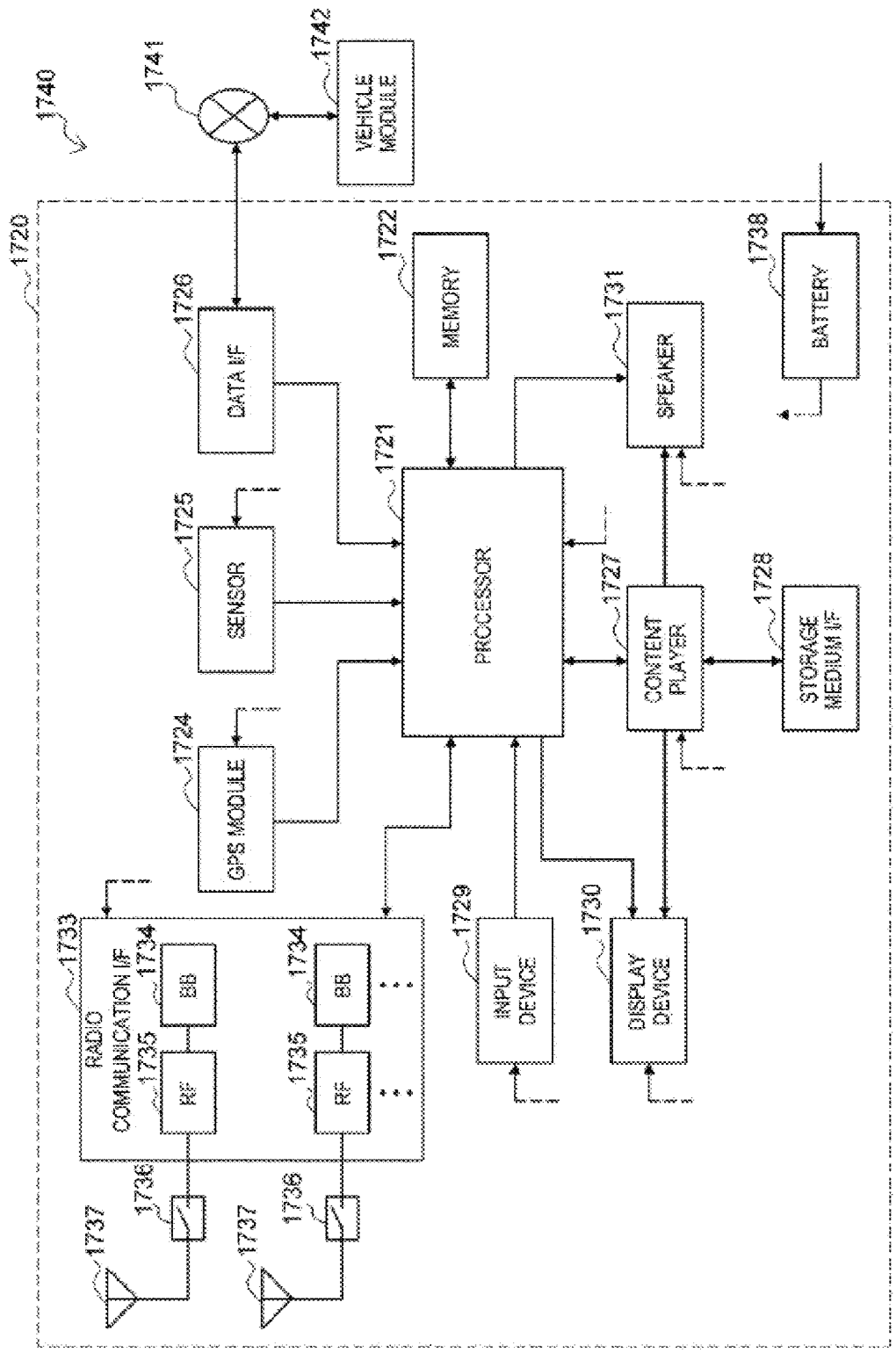
FIG. 15 is a block diagram illustrating an example of a schematic configuration of a car navigation device to which the technology of the present disclosure can be applied.

FIG. 15 is a block diagram illustrating an example of a schematic configuration of a car navigation device 1720 to which the technology of the present disclosure can be applied. A car navigation device 1720 includes a processor 1721, a memory 1722, a global positioning system (GPS) 1724, a sensor 1725, a data interface 1726, a content player 1727, a storage medium interface 1728, an input device 1729, a display device 1730, a speaker 1731, a radio communication interface 1733, one or more antenna switches 1736, one or more antennas 1737, and a battery 1738. In an implementation, the car navigation device 1720 (or the processor 1721) herein can correspond to the above-described electronic device 400.

The processor 1721 can be, for example, a CPU or a SoC, and controls the navigation function and other functions of the car navigation device 1720. The memory 1722 includes a RAM and a ROM, and stores a program that is executed by the processor 1721.

The GPS module 1724 performs measurement on a location (such as a latitude, a longitude, and an altitude) of the car navigation device 1720 by using GPS signals received from GPS satellites. The sensor 1725 can include a set of sensors, such as a gyro sensor, a geomagnetic sensor, and an air pressure sensor. The data interface 1726 is connected to, for example, an in-vehicle network 1741 via a terminal not shown, and acquires data generated by the vehicle (such as vehicle speed data).

The content player 1727 plays back content stored in a storage medium (such as a CD and a DVD), which is inserted into the storage medium interface 1728. The input device 1729 includes, for example, a touch sensor configured to detect touches on the screen of the display device 1730, buttons, or switches, and receives input operations or information of a user. The display device 1730 includes a screen, for example, an LCD or OLED screen, and displays images for the navigation function or playback content. The speaker 1731 outputs the sound for the navigation function or playback content.

The radio communication interface 1733 supports any cellular communication scheme (such as LTE, LTE-Advanced, and NR) and performs radio communication. The radio communication interface 1733 can typically include, for example, a BB processor 1734 and an RF circuit 1735. The BB processor 1734 can perform, for example, encoding/decoding, modulation/demodulation, and multiplexing/demultiplexing, and performs various types of signal processing for radio communication. Meanwhile, the RF circuit 1735 can include, for example, a mixer, a filter, and an amplifier, and transmits and receives radio signals via the antenna 1737. The radio communication interface 1733 can alternatively be a chip module on which the BB processor 1734 and the RF circuit 1735 are integrated. As shown in FIG. 15, the radio communication interface 1733 can include multiple BB processors 1734 and multiple RF circuits 1735. Although FIG. 15 illustrates the example in which the radio communication interface 1733 includes the multiple BB processors 1734 and the multiple RF circuits 1735, the radio communication interface 1733 can also include a single BB processor 1734 or a single RF circuit 1735.

In addition to a cellular communication scheme, the radio communication interface 1733 can support other types of radio communication schemes, such as a short-range wireless communication scheme, a near-field communication scheme, and a wireless LAN scheme. In this case, the radio communication interface 1733 can include the BB processor 1734 and the RF circuit 1735 as to each radio communication scheme.

Each of the antenna switches 1736 switches the connection destination of the antenna 1737 among multiple circuits (for example, circuits for different radio communication schemes) included in the radio communication interface 1733.

Each of the antennas 1737 includes one or more antenna elements (such as multiple antenna elements included in a MIMO antenna), and is used for the radio communication interface 1733 to transmit and receive radio signals. As shown in FIG. 15, the car navigation device 1720 can include multiple antennas 1737. Although FIG. 15 illustrates an example in which the car navigation device 1720 includes multiple antennas 1737, the car navigation device 1720 can alternatively include a single antenna 1737.

In addition, the car navigation device 1720 can include the antenna 1737 for every radio communication scheme. In this case, the antenna switch 1736 can be removed from configuration of the car navigation device 1720.

The battery 1738 provides power for various blocks of the car navigation device 1720 illustrated in FIG. 15 via feeders, and the feeders are partially expressed as dashed lines in the figure. The battery 1738 accumulates power supplied by the vehicle.

The technology of the present disclosure can also be implemented as an in-vehicle system (or vehicle) 1740 including one or more blocks of the car navigation device 1720, the in-vehicle network 1741, and a vehicle module 1742. The vehicle module 1742 generates vehicle data (such as vehicle speed, engine speed, and failure information), and outputs the generated data to the in-vehicle network 1741.

It should be understood that the technical solutions of the present disclosure may be implemented in the following example implementations.

1. An electronic device for a terminal device, including a processing circuit configured to:
 send a first message to a network, where the first message includes both a first PDU session establishment request message for a first PDU session and a Router Solicitation (RS); and
 in response to the sending of the first message, receive a second message from the network, the second message including both a first PDU session establishment accept message for the first PDU session and a Router Advertisement (RA), where the RA includes a first IPv6 prefix.

2. The electronic device according to article 1, where the first PDU session establishment accept message further includes a first interface identifier assigned to the terminal device by a session management function (SMF), and the processing circuit is further configured to:
 generate a link-local address based on the first interface identifier; and/or
 generate a first IPv6 address based on the first IPv6 prefix and a second interface identifier, where the second interface identifier is the first interface identifier or is another interface identifier generated by the terminal device.

3. The electronic device according to article 2, where the processing circuit is further configured to:
 prior to sending the first message, generate an EUI-64 interface identifier based on a local MAC address.

4. The electronic device according to article 1, where the processing circuit is further configured to:
 send a second PDU session establishment request message for a second PDU session and reuse indication information to the network, where the reuse indication information indicates that at least the first IPv6 prefix is to be reused for the second PDU session.

5. The electronic device according to article 4, where the processing circuit is further configured to:
 prior to sending the second PDU session establishment request message, send a first PDU session release request message for the first PDU session and reuse request information to the network, where the reuse request information indicates that the terminal device expects to reuse at least the first IPv6 prefix; and
 receive a first PDU session release response message for the first PDU session and reuse acknowledgment information from the network, where the reuse acknowledgment information indicates that the network is ready to reuse at least the first IPv6 prefix.

6. The electronic device according to article 4 or 5, where the reuse indication information, the reuse request information, or the reuse acknowledgment information is also used for reuse of the first interface identifier.

7. The electronic device according to article 1, where the network includes a non-terrestrial network.

8. The electronic device according to article 5, where at least one of the following is true:
 the RS is included in or separated from the first PDU session establishment request message, and both are included in an N1 SM container;
 the RA is included in or separated from the first PDU session establishment accept message, and both are included in an N1 SM container;
 the reuse indication information is included in or separated from the second PDU session establishment request message, and both are included in an N1 SM container;
 the reuse request information is included in or separated from the first PDU session release request message, and both are included in an N1 SM container; or
 the reuse acknowledgment information is included in or separated from the first PDU session release response message, and both are included in an N1 SM container.

9. An electronic device for a session management function (SMF), including a processing circuit configured to:
 in response to reception of a first message from a terminal device, assign a first interface identifier and a first IPv6 prefix to the terminal device, where the first message includes both a first PDU session establishment request message for a first PDU session and a Router Solicitation (RS); and
 send a second message to the terminal device, the second message including a first PDU session establishment accept message for the first PDU session and a Router Advertisement (RA), where the first PDU session establishment accept message includes the first interface identifier, and the RA includes the first IPv6 prefix.

10. The electronic device according to article 9, where the processing circuit is further configured to:
  receive a second PDU session establishment request message for a second PDU session and reuse indication information from the terminal device, where the reuse indication information indicates that at least the first IPv6 prefix is to be reused for the second PDU session; and
  in response to the reception of the second PDU session establishment request message, reuse at least the first IPv6 prefix for the second PDU session.

11. The electronic device according to article 10, where the processing circuit is further configured to:
  prior to receiving the second PDU session establishment request message, receive a first PDU session release request message for the first PDU session and reuse request information from the terminal device, where the reuse request information indicates that the terminal device expects to reuse at least the first IPv6 prefix; and
  send a first PDU session release response message for the first PDU session and reuse acknowledgment information to the terminal device, where the reuse acknowledgment information indicates that a network is ready to reuse at least the first IPv6 prefix.

12. The electronic device according to article 10 or 11, where the reuse indication information, the reuse request information, or the reuse acknowledgment information is also used for reuse of the first interface identifier, and the processing circuit is further configured to: in response to the reception of the second PDU session establishment request message, also reuse the first interface identifier for the second PDU session.

13. The electronic device according to article 10, where the processing circuit is further configured to:
  receive a third PDU session establishment request message for a third PDU session and second reuse indication information from a second terminal device, where the second reuse indication information indicates that an original IPv6 prefix and/or original interface identifier of the second terminal device are/is to be applied to the third PDU session;
  receive the original IPv6 prefix and/or original interface identifier of the second terminal device provided by a second SMF; and
  reuse the original IPv6 prefix and original interface identifier for the third PDU session.

14. The electronic device according to article 12, where at least one of the following is true:
  the RS is included in or separated from the first PDU session establishment request message, and both are included in an N1 SM container;
  the RA is included in or separated from the first PDU session establishment accept message, and both are included in an N1 SM container;
  the reuse indication information is included in or separated from the second PDU session establishment request message, and both are included in an N1 SM container;
  the reuse request information is included in or separated from the first PDU session release request message, and both are included in an N1 SM container; or
  the reuse acknowledgment information is included in or separated from the first PDU session release response message, and both are included in an N1 SM container.

15. A communication method, including:
  sending a first message to a network, where the first message includes both a first PDU session establishment request message for a first PDU session and a router solicitation (RS); and
  in response to the sending of the first message, receiving a second message from the network, the second message including both a first PDU session establishment accept message for the first PDU session and a router advertisement (RA), where the RA includes a first IPv6 prefix.

16. A communication method, including:
  in response to reception of a first message from a terminal device, assigning a first interface identifier and a first IPv6 prefix to the terminal device, where the first message includes both a first PDU session establishment request message for a first PDU session and a router solicitation (RS); and
  sending a second message to the terminal device, the second message including a first PDU session establishment accept message for the first PDU session and a router advertisement (RA), where the first PDU session establishment accept message includes the first interface identifier, and the RA includes the first IPv6 prefix.

17. A computer program product, where the computer program product includes instructions which, when executed by a computer, cause implementation of the method according to article 15 or 16.

The exemplary embodiments of the present disclosure have been described above with reference to the drawings, but the present disclosure is of course not limited to the above examples. Those skilled in the art can obtain various changes and modifications within the scope of the appended claims, and it should be understood that these changes and modifications will naturally fall within the technical scope of the present disclosure.

For example, a plurality of functions included in one unit in the above embodiments may be implemented by separate devices. Alternatively, the multiple functions implemented by the multiple units in the above embodiments may be implemented by separate devices, respectively. In addition, one of the above functions can be realized by multiple units. Needless to say, such a configuration is included in the technical scope of the present disclosure.

In this specification, the steps described in the flowchart include not only processes performed in time series in the described order, but also processes performed in parallel or individually rather than necessarily in time series. In addition, even in the steps processed in time series, needless to say, the order can be changed appropriately.

Although the present disclosure and its advantages have been described in detail, it should be understood that various modifications, replacements, and changes can be made without departing from the spirit and scope of the present disclosure as defined by the appended claims. Moreover, terms "comprise", "include", or any other variations thereof are intended to cover non-exclusive inclusions, so that processes, methods, articles or devices containing a series of elements not only contain these elements, but also contain other elements which are not clearly listed, or further contain elements which are inherent to these processes, methods, articles or devices. Under the condition of no more limitations, an element defined by the statement "including . . . " does not exclude existence of the same other elements in a process, method, articles or device including the element.

The invention claimed is:

1. An electronic device for a terminal device, comprising a processing circuit configured to:
   send a first message to a network,
   wherein the first message comprises both a first PDU session establishment request message for a first PDU session and a Router Solicitation (RS);
   in response to the first message, receive a second message from the network, the second message comprising both a first PDU session establishment accept message for the first PDU session and a Router Advertisement (RA),
   wherein the RA comprises a first IPv6 prefix;
   establish the first PDU session based on the first PDU session establishment accept message and the first IPv6 prefix;
   send a first PDU session release request message for the first PDU session and reuse request information to the network,
   wherein the reuse request information indicates that the terminal device expects to reuse the first IPv6 prefix for a second PDU session;
   receive a first PDU session release response message for the first PDU session and reuse acknowledgment information from the network,
   wherein the reuse acknowledgment information indicates that the network is ready to reuse the first IPv6 prefix;
   send a third message to the network, the third message including both a second PDU session establishment request message for the second PDU session and reuse indication information,
   wherein the reuse indication information indicates that the first IPv6 prefix is to be reused for the second PDU session;
   in response the third message, receive a fourth message from the network, the fourth message comprising a second PDU session establishment accept message for the first PDU session, the second PDU session establishment accept message including an acknowledgement indicator whether or not the reuse indication information in the third message is acknowledged; and
   establish the second PDU session based on the second PDU session establishment accept message and the acknowledgement indicator.

2. The electronic device according to claim 1, wherein the first PDU session establishment accept message further comprises a first interface identifier assigned to the terminal device by a session management function (SMF) of the network, and the processing circuit is further configured to:
   generate a link-local address based on the first interface identifier; and/or
   generate a first IPv6 address based on the first IPv6 prefix and a second interface identifier,
   wherein the second interface identifier is the first interface identifier or is another interface identifier generated by the terminal device.

3. The electronic device according to claim 2, wherein the processing circuit is further configured to:
   prior to sending the first message, generate an EUI-64 interface identifier based on a local MAC address.

4. The electronic device according to claim 1, wherein the reuse indication information, the reuse request information, or the reuse acknowledgment information is also used for reuse of the first interface identifier.

5. The electronic device according to claim 1, wherein the network comprises a non-terrestrial network.

6. The electronic device according to claim 1, wherein all of the following is true:
   the RS is included in or separated from the first PDU session establishment request message, and both are included in a first N1 SM container;
   the RA is included in or separated from the first PDU session establishment accept message, and both are included in a second N1 SM container;
   the reuse indication information is included in or separated from the second PDU session establishment request message, and both are included in a third N1 SM container;
   the reuse request information is included in or separated from the first PDU session release request message, and both are included in a fourth N1 SM container; and
   the reuse acknowledgment information is included in or separated from the first PDU session release response message, and both are included in a fifth N1 SM container.

7. An electronic device for a session management function (SMF) in a network, comprising a processing circuit configured to:
   receive a first message from a terminal device,
   wherein the first message comprises both a first PDU session establishment request message for a first PDU session and a Router Solicitation (RS);
   in response to the first message, assign a first interface identifier and a first IPv6 prefix to the terminal device, and send a second message to the terminal device, the second message comprising a first PDU session establishment accept message for the first PDU session and a Router Advertisement (RA),
   wherein the first PDU session establishment accept message comprises the first interface identifier, and the RA comprises the first IPv6 prefix;
   establish the first PDU session based on the first PDU session establishment accept message and the first IPv6 prefix;
   receive a first PDU session release request message for the first PDU session and reuse request information from the terminal device,
   wherein the reuse request information indicates that the terminal device expects to reuse the first IPv6 prefix for a second PDU session;
   send a first PDU session release response message for the first PDU session and reuse acknowledgment information to the terminal device,
   wherein the reuse acknowledgment information indicates that the network is ready to reuse the first IPv6 prefix;
   receive a third message from the terminal device, the third message including both a second PDU session establishment request message for the second PDU session and reuse indication information,
   wherein the reuse indication information indicates that the first IPv6 prefix is to be reused for the second PDU session;
   in response to the third message, send a fourth message to the terminal device, the fourth message comprising a second PDU session establishment accept message for the first PDU session, the second PDU session establishment accept message including an acknowledgement indicator whether or not the reuse indication information in the third message is acknowledged; and
   establish the second PDU session based on the second PDU session establishment accept message and the acknowledgement indicator.

8. The electronic device according to claim 7, wherein the reuse indication information, the reuse request information, or the reuse acknowledgment information is also used for reuse of the first interface identifier, and the processing circuit is further configured to:
in response to the second PDU session establishment request message, also reuse the first interface identifier for the second PDU session.

9. A communication method performed by a terminal device, the communication method comprising:
sending a first message to a network,
wherein the first message comprises both a first PDU session establishment request message for a first PDU session and a router solicitation (RS);
in response to the first message, receiving a second message from the network, the second message comprising both a first PDU session establishment accept message for the first PDU session and a router advertisement (RA),
wherein the RA comprises a first IPv6 prefix;
establishing the first PDU session based on the first PDU session establishment accept message and the first IPv6 prefix;
sending a first PDU session release request message for the first PDU session and reuse request information to the network,
wherein the reuse request information indicates that the terminal device expects to reuse the first IPv6 prefix for a second PDU session;
receiving a first PDU session release response message for the first PDU session and reuse acknowledgment information from the network,
wherein the reuse acknowledgment information indicates that the network is ready to reuse the first IPv6 prefix;
sending a third message to the network, the third message including both a second PDU session establishment request message for the second PDU session and reuse indication information,
wherein the reuse indication information indicates that the first IPv6 prefix is to be reused for the second PDU session;
in response to the third message, receiving a fourth message from the network, the second message comprising a second PDU session establishment accept message for the first PDU session, the second PDU session establishment accept message including an acknowledgement indicator whether or not the reuse indication information in the third message is acknowledged; and
establishing the second PDU session based on the second PDU session establishment accept message and the acknowledgement indicator.

10. A communication method performed by a session management function (SMF) in a network, the communication method comprising:
receiving a first message from a terminal device,
wherein the first message comprises both a first PDU session establishment request message for a first PDU session and a router solicitation (RS);
in response to the first message, assigning a first interface identifier and a first IPv6 prefix to the terminal device, and sending a second message to the terminal device, the second message comprising a first PDU session establishment accept message for the first PDU session and a router advertisement (RA),
wherein the first PDU session establishment accept message comprises the first interface identifier, and the RA comprises the first IPv6 prefix;
establishing the first PDU session based on the first PDU session establishment accept message and the first IPv6 prefix;
receiving a first PDU session release request message for the first PDU session and reuse request information from the terminal device,
wherein the reuse request information indicates that the terminal device expects to reuse the first IPv6 prefix for a second PDU session;
sending a first PDU session release response message for the first PDU session and reuse acknowledgment information to the terminal device,
wherein the reuse acknowledgment information indicates that the network is ready to reuse the first IPv6 prefix;
receiving a third message from the terminal device the third message including both a second PDU session establishment request message for the second PDU session and reuse indication information,
wherein the reuse indication information indicates that the first IPv6 prefix is to be reused for the second PDU session;
in response to the third message, sending a fourth message to the terminal device, the fourth message comprising a second PDU session establishment accept message for the first PDU session, the second PDU session establishment accept message including an acknowledgement indicator whether or not the reuse indication information in the third message is acknowledged; and
establishing the second PDU session based on the second PDU session establishment accept message and the acknowledgement indicator.

* * * * *